US012662390B2

(12) United States Patent
Azimi et al.

(10) Patent No.: US 12,662,390 B2
(45) Date of Patent: Jun. 23, 2026

(54) METHOD AND SYSTEM FOR SUPERCRITICAL FLUID EXTRACTION OF METAL

(71) Applicant: The Governing Council of the University of Toronto, Toronto (CA)

(72) Inventors: Gisele Azimi, Toronto (CA); Yuxiang Bill Yao, Calgary (CA); Jiakai Zhang, Toronto (CA); John Joseph Naguib Anawati, Ottawa (CA)

(73) Assignee: THE GOVERNING COUNCIL OF THE UNIVERSITY OF TORONTO

( * ) Notice: Subject to any disclaimer, the term of this patent is extended or adjusted under 35 U.S.C. 154(b) by 1041 days.

(21) Appl. No.: 17/045,128

(22) PCT Filed: Nov. 22, 2018

(86) PCT No.: PCT/IB2018/059196
§ 371 (c)(1),
(2) Date: Oct. 2, 2020

(87) PCT Pub. No.: WO2019/193413
PCT Pub. Date: Oct. 10, 2019

(65) Prior Publication Data
US 2021/0265678 A1     Aug. 26, 2021

Related U.S. Application Data

(60) Provisional application No. 62/651,848, filed on Apr. 3, 2018.

(51) Int. Cl.
| | |
|---|---|
| *H01M 10/54* | (2006.01) |
| *B01J 3/00* | (2006.01) |
| *C01F 17/224* | (2020.01) |
| *C01F 17/276* | (2020.01) |
| *C22B 3/00* | (2006.01) |
| *C22B 7/00* | (2006.01) |
| *C22B 11/00* | (2006.01) |
| *C22B 26/12* | (2006.01) |
| *C22B 30/02* | (2006.01) |
| *C22B 59/00* | (2006.01) |
| *B01D 11/02* | (2006.01) |

(52) U.S. Cl.
CPC ............. *C01F 17/276* (2020.01); *B01J 3/008* (2013.01); *C01F 17/224* (2020.01); *C22B 7/007* (2013.01); *C22B 11/046* (2013.01); *C22B 23/0438* (2013.01); *C22B 26/12* (2013.01); *C22B 30/02* (2013.01); *C22B 59/00* (2013.01); *H01M 10/54* (2013.01); *B01D 11/0203* (2013.01); *B01J 3/002* (2013.01)

(58) Field of Classification Search
CPC ........ C01F 17/224; B01J 3/008; C22B 7/007; C22B 11/046; C22B 23/0438; C22B 26/12; C22B 30/02; C22B 59/00; H01M 10/54
See application file for complete search history.

(56) References Cited

U.S. PATENT DOCUMENTS 3,843,824 A     10/1974  Rosellus et al.

OTHER PUBLICATIONS

Baek et al., Industrial & Engineering Chemistry Research, (2016), v.55, p. 7154-7163.*
Shimizu et al., The journal of Supercritical Fluids, (2005), v.33, p. 235-241.*
Binnemans et al., J of Cleaner Products, (2014), v.51, p. 1-22.*
Bassetto et al., Scientia Chromatographica, (2014), 6(1), 41-49.*
Nowak et al., Molecules, (2017), v.22, p. 403 (1-21).*
Bertuol et al., Waste management, (2016), v51, p. 245-251.*
Yao et al., ACS Sustainable Chem. Eng., (2018), v.6, p. 1417-1426 (published on Nov. 24, 2017).*
Baek et al., Industrial & Engineering Chemistry Research, (2016), v.55, p. 7154-7163. (Previously provided).*
N. Kunanusont, J. Zhang, K. Watada, Y. Shimoyama, G. Azimi, "Effect of Organophosphorus Ligands on Supercritical Extraction of Neodymium from NdFeB Magnet," The Journal of Supercritical Fluids, vol. 170, 105128, 2021, DOI: 10.1016/j.supflu.2020.105128.
J. Zhang, J. Anawati, Y. Yao, and G. Azimi, "Aeriometallurgical Extraction of Rare Earth Elements from a NdFeB Magnet Utilizing Supercritical Fluids," ACS Sustainable Chem. Eng. 6, 16713-16725, 2018, DOI: 10.1021/acssuschemeng.8b03992.
Azimi et al. (Eds.) Rare Earth Technology 2020 (Springer 2020)—J. Zhang, G. Azimi, "Supercritical Fluid Extraction of Rare Earth Elements from Waste Fluorescent Lamp", Rare Earth Technology 2020, pp. 93-105. DOI: 10.1007/978-3-030-36758-9 9.
J. Zhang, K. Watada, N. Kunanusont, Mazier. Sauber, G. Azimi, "Supercritical Fluid Extraction of Rare Earth Elements from a Canadian Ore," Rare Earth Technology 2020, pp. 107-118, DOI: 10.1007/978-3-030-36758-9_10.
Yao, Y., Farac, N. F. & Aziml, G. Supercritical Fluid Extraction of Rare Earth Elements from Nickel Metal Hydride Battery. ACS Sustainable Chem. Eng. 6, 1417-1426 (2018).
Box, G. E. P., Hunter, J. S. & Hunter, W. G. Statistics for Experimenters: Design, Innovation, and Discovery. (Wiley, 2005).
Jha, M. K. et al. Review on hydrometallurgical recovery of rare earth metals. Hydrometallurgy 165, 2-26 (2016).
Goodenough, K. M., Wall, F. & Merriman, D. The Rare Earth Elements: Demand, Global Resources, and Challenges for Resourcing Future Generations. Natural Resources Res. 27, 201-216 (2017).

(Continued)

*Primary Examiner* — Yong L Chu

(74) *Attorney, Agent, or Firm* — Dinsmore & Shohl LLP

(57) ABSTRACT

A method for supercritical fluid extraction of metal from a source, the method comprising: providing a reactor chamber; providing a source comprising a target metal; optionally, providing a chelating agent; providing a solvent; adding the source comprising the target metal, the chelating agent and the solvent into the reactor chamber; adjusting the temperature and pressure in the reactor chamber so that the solvent is heated and compressed above its critical temperature and pressure; optionally, providing mechanical agitation to the reactor chamber; recovering a chelate comprising the target metal.

20 Claims, 22 Drawing Sheets

(56) References Cited

OTHER PUBLICATIONS

Global Wind Energy Council. Global Wind Report 2016—Annual market update. Global Wind Report 2016 (2016). Available at: http://gwec.net/publications/ global-wind-report-2/ global-windÂ-report-2016/.

Tan, Q., Deng, C. & Li, J. Innovative Application of Mechanical Activation for Rare Earth Elements Recovering: Process Optimization and Mechanism Exploration. Scientific Reports 6, 19961 (2016).

European Parliament. Recovery of Rare Earths from Electronic Wastes: An opportunity for High-Tech SMEs. Study for the ITRE Committee (2015).

Kitagawa, J. & Uemura, R. Rare Earth Extraction from NdFeB Magnet Using a Closed-Loop Acid Process. Scientific Reports 7:8039, 1-6 (2017).

Onal, M.A. R., Borra, C.R., Guo, M., Blanpain, B. & Van Gerven, T. Hydrometallurgical recycling of NdFeB magnets: Complete leaching, iron removal and electrolysis. J. Rare Earths 35, 574-584 (2017).

Onal, M.A. R. et al. Recycling of NdFeB magnets using nitration, calcination and water leaching for REE recovery. Hydrometallurgy 167, 115-123 (2017).

Lee, C. H. et al. Selective leaching process for neodymium recovery from scrap Nd-Fe-B magnet. Metallurgical Mater. Trans. A 44A, 5825-5833 (2013).

Tunsu, C., Petranikova, M., Gergoric, M., Ekberg, C. & Retegan, T. Reclaiming rare earth elements from end-of-life products: A review of the perspectives for urban mining using hydrometallurgical unit operations. Hydrometallurgy 156, 239-258 (2015).

Kershaw, J. R. & Jezko, J. Supercritical Gas Extraction of South African Coals. Separation Sci. Technol. 17, 151-166 (1982).

James F. Ely, J. K. B. A Review of Supercritical Fluid Extraction. US Dept. Commerce/National Bureau of Standards (U.S. Government Printing Office, 1983).

Yakimishen, R. Cenkowski, S. Muir, W. E. Oll recoveries from sea buckthorn seeds and pulp. United States Department of Agriculture National Agricultural Library (2005), Abstract.

Budich, M. & Brunner, G. Supercritical fluid extraction of ethanol from aqueous solutions. J. Supercritical Fluids 25, 45-55 (2003).

Gumerov, F. , Sagdeev, A. , Gallyamov, R. , Galimova, A. and Sagdeev, K. Regeneration of the Catalysts by Supercritical Fluid Extraction. Int. J. Anal. Mass Spectrom. Chromatogr. 2, 1-14 (2014).

De Fillipi, R. P., et al.. Supercritical Fluid Regeneration of Activated Carbon for Adsorption of Pesticides. EPA Grant No. R804554 Report (1980).

Ding, X., Liu, Q., Hou, X. & Fang, T. Supercritical Fluid Extraction of Metal Chelate: A Review. Critical Reviews in Analytical Chemistry 47(2), 99-118 (2017).

Wal, C. M. & Waller, B. Dissolution of metal species in supercritical fluids—Principles and applications. Ind. Eng. Chem. Res. 39, 4837-4841 (2000).

Lin, Y., Liu, C., Wu, H., Yak, H. K. & Wai, C. M. Supercritical fluid extraction of toxic heavy metals and uranium from acidic solutions with sulfur-containing organophosphorus reagents. Ind. Eng. Chem. Res. 42, 1400-1405 (2003).

Prakash, V., Sun, Z. H. I., Sietsma, J. & Yang, Y. Electrochemical Recovery of Rare Earth Elements From Magnet Scraps—a Theoretical Analysis. ERES2014: !st European Rare Earth Resources Conference, Milos. 163-170 (2014 ).

Baek, D. L. et al. Extraction of Rare Earth Oxides Using Supercritical Carbon Dioxide Modified with Tri-n-Butyl Phosphate-Nitric Acid Adducts. Ind. Eng. Chem. Res. 55, 7154-7163 (2016).

Duan, W., Cao, P. & Zhu, Y. Extraction of rare earth elements from their oxides using organophosphorus reagent complexes with HNO3 and H2O in supercritical CO2. J Rare Earths 28, 221- 226 (2010).

Gensler, M. et al. Mechanical rupture of mono- and bivalent transition metal complexes m experiment and theory. J Phys. Chem. C 119, 4333-4343 (2015).

Gensler, M., Eldamshaus, C., Taszarek, M., Reissig, H.-U. & Rabe, J.P. Mechanical stability of bivalent transition metal complexes analyzed by single-molecule force spectroscopy. Bellstein J Org. Chem. 11, 817-827 (2015).

Zhu, L. Y., Wang, Z. F., He, H. & Tlan, G. Competition between lanthanides in extraction with tri-n-butyl phosphate in supercritical CO2 from solid nitrates. RSC Adv. 6, 96531-96537 (2016).

Ren, Q. et al. Solubility of novel open-chain crown ether bridged diphosphates in supercritical carbon dioxide. J Chem. Thermodynamics 67, 40-47 (2013).

Karshigina, Z. et al. Processing of Phosphorus Slag with Recovery of Rare Earth Metals and Obtaining Silicon Containing Cake. IOP Conf. Ser. Earth Environ. Scl. 44, (2016).

Cui, Z., Zhang, G., Song, W. & Song, Y. Supercritical Fluid Extraction of Metal Lons from a Solid Matrix with 8- Hydroxyquinoline and Carbon Dioxide. J Liq. Chromatogr. Relat. Technol. 27,(2004).

Fujihara, T. Passivity of Iron by Dilute Nitric Acid. Ind. Eng. Chem. 18, 62-63 (1925).

Argus Consulting Services. Argus Rare Earths Monthly Outlook 17-9 (2017).

Song, Y. W., Zhang, H., Yang, H. X. & Song, Z. L. A comparative study on the corrosion behavior of NdFeB magnets in different electrolyte solutions. Materials and Corrosion 59 (10), 794-801 (2008).

Schultz, L., El-Aziz, A. M., Barkleit, G. & Mummert, K. Corrosion behaviour of Nd-Fe-B permanent magnetic alloys. Mater. Scl. Eng. A 267, 307-313 (1999).

Bala, H., Szymura, S. & Wyslocki, J. J. Electrochemical corrosion resistance of Fe-Nd-B permanent magnets. J. Mater Sci. 25, 571-574 (1990).

Cannon, R. D. The Dissolution of Iron and Nickel in Dilute Aqua Regia. (U.S. Atomic Energy Commission, 1961).

Fox, R. V. et al. Praseodymium nitrate and neodymium nitrate complexation with organophosphorus reagents in supercritical carbon dioxide solvent. J. Supercritical Fluids 31, 273-286 (2004).

Shimizu, R., Sawada, K., Enokida, Y. & Yamamoto, I. Supercritical fluid extraction of rare earth elements from luminescent material in waste fluorescent lamps. J. Supercritical Fluids 33, 235-241 (2005).

Braatz, A. D., Antonio, M. R. & Nilsson, M. Structural study of complexes formed by acidic and neutral organophosphorus reagents. Dalton Trans. 46, 1194-1206 (2017).

Schulze, R. & Buchert, M. Estimates of global REE recycling potentials from NdFeB magnet material. Resour. Conserv. Recycl. 113, 12-27 (2016).

International Search Report and Written Opinion, PCT/IB2018/059196, Feb. 28, 2019.

El-Aziz. Corrosion resistance of Nd-Fe-B permanent magnetic alloys Part 1: Role of alloying elements. Materials and Corrosion 54: 88-92 (2003).

International Search Report and Written Opinion issued by the Canadian Intellectual Property Office acting as International Searching Authority for International Application No. PCT/IB2018/059196 dated Feb. 28, 2019 (7 pages).

Yao, Yuxiang, et al., "Supercritical Fluid Extraction of Rare Earth Elements from Nickel Metal Hydride Battery," ACS Sustainable Chem. Eng. 2018, vol. 6, pp. 1417-1426.

Baek, Donna L., et al., "Extraction of Rare Earth Oxides Using Supercritical Carbon Dioxide Modified with Tri-n-Butyl Phosphate-Nitric Acid Adducts," Ind. Eng. Chem. Res. 2016, vol. 55, pp. 7154-7163.

Shimizu, Ryouke, et al., "Supercritical fluid extraction of rare earth elements from luminescent material in waste fluorescent lamps," J. of Supercritical Fluids, vol. 33, pp. 235-241 (2005).

* cited by examiner a) Original battery b) After opening casing c) After removing casing d) Battery modules pack d) Individual modules Potential TBP-HNO₃-H₂O Complex Structures

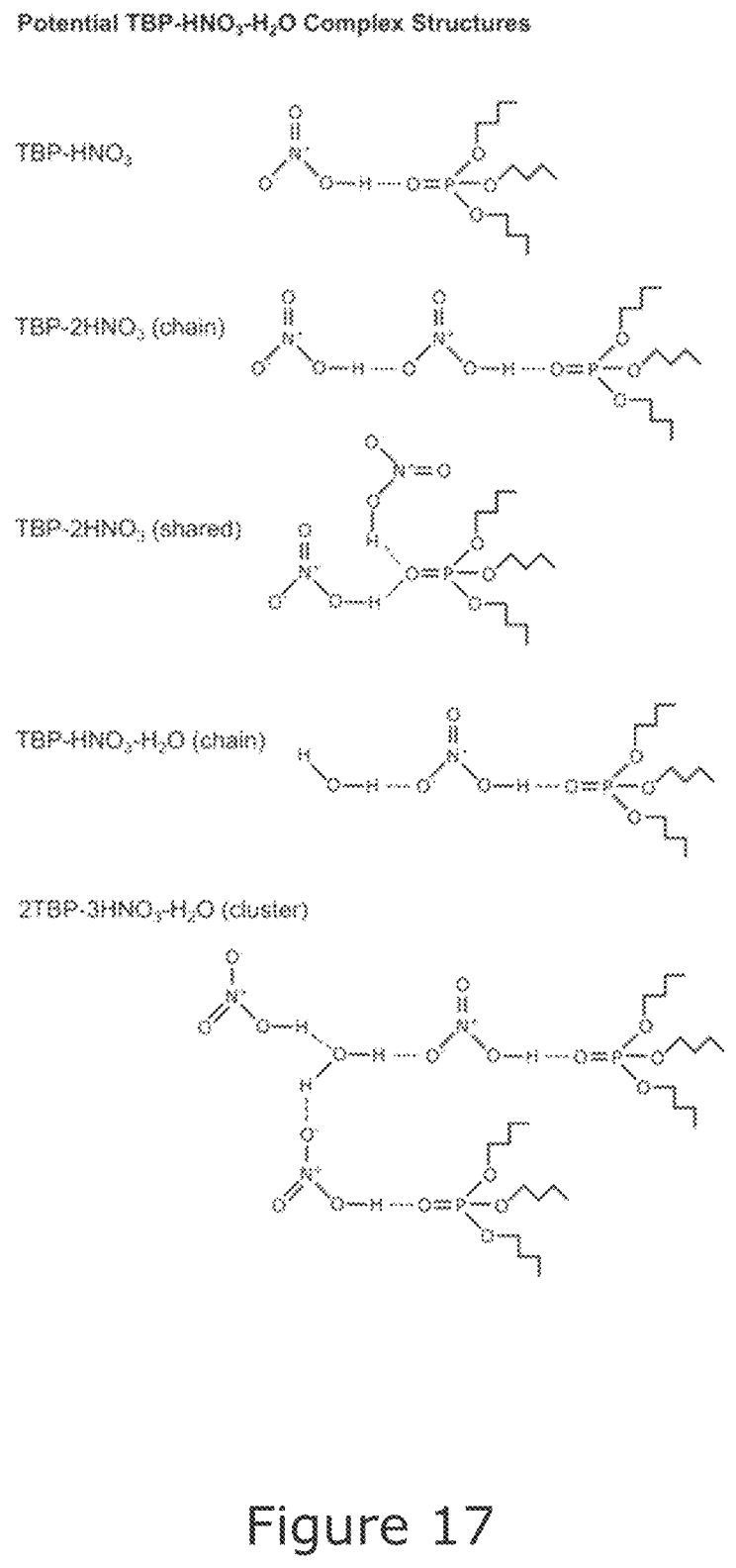

TBP-HNO₃

TBP-2HNO₃ (chain)

TBP-2HNO₃ (shared)

TBP-HNO₃-H₂O (chain)

2TBP-3HNO₃-H₂O (cluster)

Figure 17

METHOD AND SYSTEM FOR SUPERCRITICAL FLUID EXTRACTION OF METAL

FIELD OF THE INVENTION

The present invention relates to the extraction of metals, and more particularly, to the supercritical fluid extraction—aeriometallurgy—of metals from a broad range of sources.

BACKGROUND

Supercritical Fluid Extraction

Supercritical fluid extraction (SCFE) processes have focused on the energy industry, including direct liquefaction of coal and enhanced oil recovery from petroleum reservoirs. SCFE processes have also been involved in the chemical industry, including food and pharmaceuticals. Examples include coffee decaffeination, wood and vegetable oil production, and extraction of organics like alcohols from aqueous solutions.

SCFE has been used for the recovery of various metals in recent years. This is a rapidly growing field because of the desirable properties of supercritical fluids (SCFs) as solvents. A fluid is described as supercritical, once it has been heated and compressed above its critical temperature and pressure. SCFs have a low viscosity and a high diffusivity (gas-like properties), and the ability to dissolve materials like a liquid. These properties enable them to penetrate and transport solutes from different matrices at a higher rate and more efficiently compared with that in a liquid phase.

The most widely used SCF is supercritical $CO_2$ (sc-$CO_2$), because of its moderate critical points (Tc=304.25 K (31.1° C.), Pc=7.38 MPa, $\rho$=471 kg/m$^3$). It is also non-toxic, inexpensive, non-flammable, and inert, making it environmentally friendly and easy to recycle, as SCFE does not produce secondary waste. The most advantageous property of sc-$CO_2$ compared with traditional organic solvents is the excellent mass transfer that combines high diffusivity of gas with reasonably good solvation of liquid, enhancing solute extraction rates from various matrices. Furthermore, the final extraction products from SCFE are easily recoverable. Sc-$CO_2$ can be considered a switchable solvent, i.e., near the critical point, small changes in pressure or temperature result in large changes in the physical properties of $CO_2$, particularly density, allowing many process-critical properties of the solvent, such as the solubility, to become time-separated, i.e., the properties can be adjusted, fine-tuned, or switched at different points in time and/or space in response to triggers, in this case depressurization. Because of these switchable properties, supercritical fluids are suitable alternatives for organic solvents in a range of industrial and laboratory processes. Because sc-$CO_2$ is a non-polar solvent, there is a significant polarity difference between the solute and solvent when extracting metal ions and organometallic compounds. In such cases, it is therefore necessary to utilize complexing (chelating) agents to satisfy the charge neutrality and improving solvent-solute interactions.

In addition to all potential benefits, there are also some challenges associated with SCFE. Most previous studies of SCFE are at bench scale, and there exist some challenges with the process scale up and transition from bench scale to pilot plant and commercial operation. There is limited knowledge of the mechanisms governing the kinetics in processes running under supercritical conditions, which limits the ability to determine the size and geometry of the reactor. Furthermore, there is a lack of phase equilibrium and enthalpy data as well as fundamentally based thermodynamic models that could accurately predict the extraction behavior, which makes the process design and economic evaluation difficult. Also, there are challenges with energy losses during decompression, high pressure materials selection, and difficulties with process control under supercritical conditions.

It would be advantageous to develop efficient SCFE processes to apply to a broader range of useful applications. For example, it would be beneficial to improve processes for SCFE of REEs from postconsumer products, such as real anode material of a Hybrid Electric Vehicle (HEV).

Recycling Rare Earth Elements from Waste Electrical & Electronic Equipment

With the growing awareness to protect the environment and motivation for compliance with environmental regulations, the sustainability of traditional linear economy (make, use, dispose) is questionable. With the aim of building a more sustainable future and enabling a circular economy (make, use, recover), waste valorisation and recycling of end-of-life products has been rapidly expanding. With the increasing focus on reducing greenhouse gas (GHG) emissions, the use of green energy technologies, such as wind turbines, hybrid and electric vehicles, photovoltaic cells and fluorescent lighting has been widely promoted. The performance of these emerging green technologies relies upon the unique physiochemical properties of their critical building block materials, such as rare earth elements (REEs).

According to the historic data, the annual demand for REEs has been increasing at a rate of 5.3% annually, but it is predicted that the rate could increase to 25% annually, as more green technologies for renewable power generation (in particular wind and solar) and electrified transportation will join the market to meet target GHG emissions—for example, to stabilize global $CO_2$ concentrations at about 450 ppm by 2050. REEs are in increasingly high demand, but facing supply uncertainty and near zero recycling. To tackle the sustainability challenges associated with rare earth elements supply, new strategies have been initiated to mine these elements from secondary sources. Waste electrical and electronic equipment contain considerable amounts of rare earth elements; however, the current level of their recycling is less than 6-7%.

REEs are not necessarily rare, but their supply is insecure because of geologic scarcity, extraction difficulties, and dependence on sources in politically volatile countries. Existing REE raw materials could meet many decades of increased demand, but the challenge is scaling up the supply at a rate that matches expected increases in demand. Developing new mines, including prospecting, siting, permitting and construction of refinery facilities, can take a decade or more. Thus, to tackle their supply challenge and satisfy their demand, many countries have initiated activities to look for alternative "secondary resources". Examples of such sources are REE containing postconsumer products, including lamp phosphors, permanent magnets and hybrid electric vehicle (HEV) batteries, as well as stocks of landfilled industrial process residues.

Waste electrical and electronic equipment (WEEE), including permanent magnets and NiMH batteries, used at both small- and large-scale including from computer hard disk drives and small tools to wind turbines and hybrid cars, contain considerable amounts of REEs. In terms of volume, Europe generates 12 million tonnes of WEEE annually and its REE recycling market is estimated to be worth at €1 billion. However, the current level of REE recycling is very limited (less than 6-7%), and there are only a few groups in Europe that are active in this field.

NIMH batteries are among most efficient rechargeable batteries that are widely used in HEVs. The anode of this battery consists a mischmetal alloy of lanthanum (La), cerium (Ce), praseodymium (Pr), and neodymium (Nd). The active material in the anode is either of the disordered $AB_5$ (LaCePrNdNiCoMnAl), $A_2B_7$ (LaCePrNdNiCoMnAl plus Mg), or disordered $AB_2$ (VTiZr—NiCrCoMnAlSn) type, where the ABx designation refers to the ratio of the A type elements (LaCePrNd or TiZr) to that of the B type elements (VNiCrCoMnAlSn). The number of HEV NiMH batteries manufactured so far is substantial, and the global annual production is expected to grow. For example, Toyota™ plans to sell 15 million units of Prius hybrid model by 2020. Approximately 7% of a typical NiMH battery is made up of REEs, which is equal to 2 kg for a HEV battery; however, the current level of REE recycling is very limited. Considering the great potential, it is imperative to develop a performant process for the urban mining of REEs from this class of WEEE.

Neodymium-iron-boron (NdFeB) magnets are a class of permanent magnets widely utilized in hybrid and electric vehicles and wind turbines. The use of these magnets has been rapidly increasing all over the world in line with increasing utilization of hybrid and electric vehicles—forecasted increase from 2.3 million units in 2016 to over 10.1 million units in 2026—as well as the increasing market for wind turbines, as the Global Wind Energy Council (GWEC) has reported a 12.6% cumulative capacity growth rate reaching a total of 486.6 GW in 2016 and a forecasted cumulative installed capacity of over 800 GW by 2021.

Managing end-of-life NdFeB magnets in an environmentally sustainable approach could not only reduce the amount of landfilled wastes, but also enable the recovery of valuable materials they contain, including neodymium (Nd), dysprosium (Dy), and praseodymium (Pr) that are in increasingly high demand and facing supply challenge. These REEs account for more than 22% of the weight of the magnet, which is more than 10 times of the minimum industrial grade of primary ores (1.5-2.0%). Researchers across disciplines around the world are investigating techniques to extract REEs from end-of-life NdFeB magnets.

Recycling of NdFeB magnet can take one of three primary routes: (i) the direct remagnetization and reuse of end-of-life magnets; (ii) the physical reprocessing of magnet waste for direct recycling into new magnets; and (iii) the metallurgical extraction of REEs from waste magnets. Direct recycling is only a viable option if the desired composition of the new magnet is the same as the old one. Because wind turbine magnets have a service life of 20-30 years, the required specifications of the end-of-life product and those of the new product could be different. Furthermore, the magnets may become corroded or otherwise damaged during their service life, rendering them unsuitable for direct recycling.

Another important application of rare earth elements (REEs) is the production of luminescent materials, which are phosphors used in cathode ray tubes and fluorescent lightbulbs (FL). The fluorescent powders that come from the separation of the luminescent materials and glass FL bodies can be used as a secondary source of REEs and other valuable materials.

At present, pyrometallurgy and hydrometallurgy are the most common approaches utilized for REE recovery. Pyrometallurgy relies upon calcination of the feed with a mixture of reducing and fluxing agents and has the drawback of high energy consumption and reaction temperature, and generation of large volumes of GHG emissions. Moreover, in most cases REEs partition into slag phases during calcination, thus an additional hydrometallurgical step is required to recover these elements. In summary, pyrometallurgical routes require high investment costs for furnaces, have high energy consumption, and REEs need to be extracted from the resulting slag using hydrometallurgical routes.

Hydrometallurgy is a well-regarded alternative for waste valorisation because of its adaptability to resources scale and relatively low energy consumption. However, although promising, this technique has the drawback of being reagent-intensive, often requiring the consumption of strong acids and organic solvents, and production of secondary streams of potentially hazardous wastes. In summary, hydrometallurgical routes require several pre-treatment steps to dismantle the battery and separate different components, consume large quantities of chemicals, including acids and organic solvents, and generate large volumes of hazardous waste. Organic solvent consumption in solvent extraction processes can be as high as twice the volume of the aqueous phase. Although, in many cases, a large portion of the organics is recycled, the organic inventory is large and there is also a loss of organics in the process.

The hydrometallurgical processes for recycling luminescent materials generally consist of a leaching step in dilute acids or other solvents to dissolve REEs, which are then precipitated by one or more precipitating agents or/and selectively extracted by one or more organic solvents. The recycling circuit can be compared with the process of extraction of rare earths from primary sources. Low recovery rates have been reported for these processes, due to the different acid resistances of the phosphors. Red phosphors (i.e. $Y_2O_3:Eu^{3+}$) are easily dissolved by diluted acid but the dissolution of the other phosphors, mainly green phosphors (i.e. $LaPO_4:Ce^{3+}$, $Tb^{3+}$ (LAP), (Gd,Mg) $B_5O_{12}:Ce^{3+}$, $Tb^{3+}$ (CBT), (Ce,Tb) $MgAl_{11}O_{19}$ (CAT)), are very difficult because they have high acid resistance.

It would be advantageous to develop a more efficient and sustainable process for the urban mining and recycling of rare earth elements from waste electrical and electronic equipment, such as nickel metal hydride batteries, permanent magnets and lamp phosphors.

SUMMARY OF THE INVENTION

"Aeriometallurgy" is a term used herein to differentiate supercritical fluid extraction from hydrometallurgy, pyrometallurgy, and solvometallurgy. The "aerio" prefix is from the Greek word for "air or gas", and is chosen to invoke the idea of a gas-like solvent.

In one aspect, the present invention provides a method for supercritical fluid extraction of metal from a source, the method comprising: providing a reactor chamber; providing a source comprising a target metal; optionally, providing a chelating agent; providing a solvent; adding the source comprising the target metal, the chelating agent and the solvent into the reactor chamber; adjusting the temperature and pressure in the reactor chamber so that the solvent is heated and compressed above its critical temperature and pressure; optionally, providing mechanical agitation to the reactor chamber; recovering a chelate comprising the target metal.

Preferably, the chelating agent is one or more compounds selected from the group consisting of an organophosphorus compound, a ketone, a dithiocarbamate, a crown ether, an ethylene oxide diphosphate derivative, a fluorinated compound, 8-hydroxyquinoline or a derivative thereof, an aminopolycarboxylic acid, an amide, an organic acid, a quaternary ammonium salt and an oxime.

Preferably, the solvent is one or more compounds selected from the group consisting of $CO_2$, water, methanol, ethanol, benzene and toluene.

In one preferred aspect, the method further comprises providing a co-solvent and adding the co-solvent to the reactor chamber. Preferably, the co-solvent is one or more compounds selected from the group consisting of methanol, water, ethanol, acetone, hexane, chloroform, dichloromethane, toluene, acetonitrile, tetrahydrofuran, aniline, diethylamine, acetic acid, ethyl acetate, 2-propanol and an imidazolium-based ionic compound. Also preferably, the co-solvent is added to the reactor chamber in an amount of about 0.01 to 50 mol %.

In a further preferred aspect, the following conditions apply:

the temperature in the reactor chamber is adjusted to a range of about 20 to 200° C.;

the pressure in the reactor chamber is adjusted to a range of about 0.01 to 45 MPa;

the source comprising the target metal, the chelating agent and the solvent are allowed to react in the reactor chamber for a residence time in a range of about 0.01 to 12 hours;

the source-to-chelating agent ratio is in a range of about 0.01 to 5;

the source comprising the target metal, the chelating agent and the solvent are subjected to an agitation rate in a range of about 0.01 to 2500 rpm; and the chelating agent comprises $HNO_3$ in a concentration of about 0.01 to 21.4 M.

In one preferred embodiment, the source is a NiMH battery and the target metal is one or more rare earth elements.

In another preferred embodiment, the source is a permanent magnet and the target metal is one or more rare earth elements.

In a further preferred embodiment, the source is a phosphor and the target metal in one or more rare earth elements.

In yet another preferred embodiment, the source is bauxite residue and the target metal is one or more rare earth elements. This preferred embodiment may optionally include a pre-neutralization step.

In another preferred embodiment, the source is a lithium ion battery and the target metal are one or more of lithium, nickel and cobalt. This preferred embodiment may optionally comprise a first extraction phase to extract organic components from the lithium ion battery and a second extraction phase, using the same or different reaction conditions, to extract the lithium, nickel and/or cobalt.

In another preferred embodiment, the source is activated carbon and the target metal is gold. Preferably, the activated carbon comprises $Au(CN)_2^-$ complex.

In another aspect, the present invention provides a system for carrying out the method for supercritical fluid extraction of metal from a source as defined by the present invention, the system comprising: a reactor chamber; a source comprising a target metal; optionally, a mechanical agitator; optionally, a chelating agent; and a solvent.

DESCRIPTION OF THE DRAWINGS

FIG. 17: Potential TBP-$HNO_3$—$H_2O$ complex structures in the chelating agent. Due to its complex analytical stoichiometry, the TBP-$HNO_3$ chelating agent likely comprises a mixture of different complexes. The structures of some of the potential structures are shown.

DETAILED DESCRIPTION OF PREFERRED EMBODIMENTS

Supercritical Fluid Extraction Process

Figure 1:
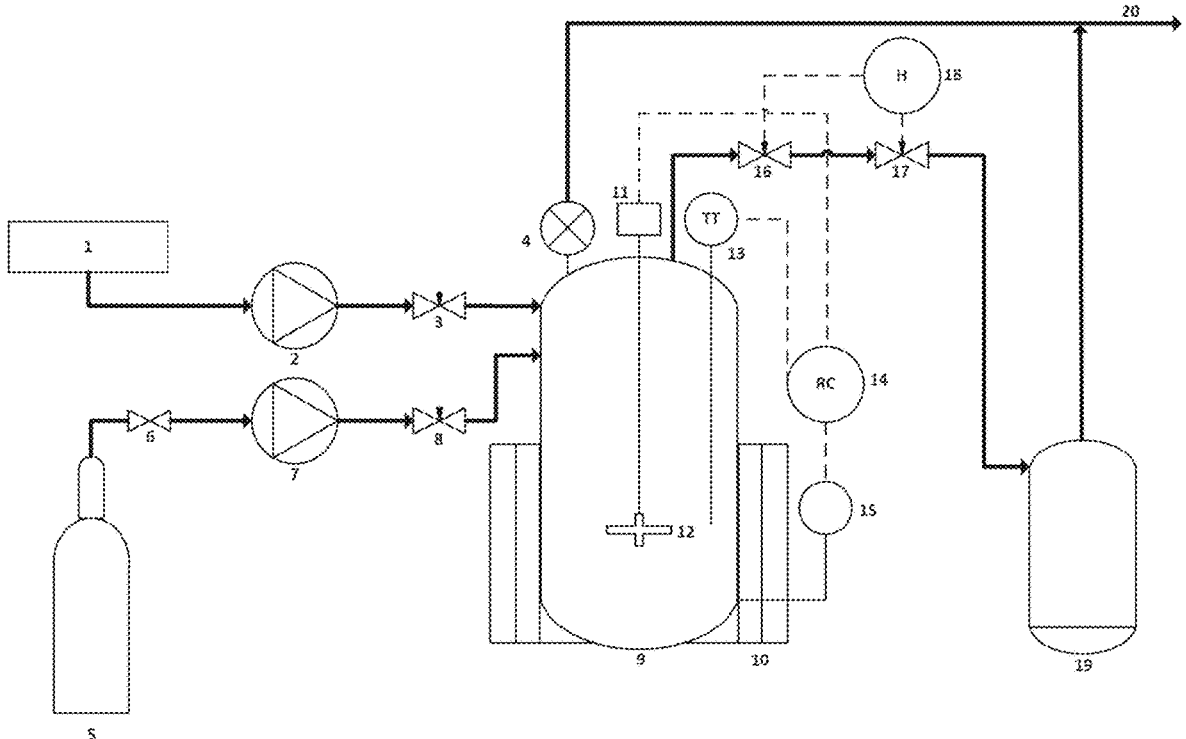
FIG. 1: Supercritical Fluid Extraction (SCFE) process flow diagram.

FIG. 1 is a Supercritical Fluid Extraction (SCFE) process flow diagram in accordance with a preferred embodiment of the present invention. The present invention preferably provides an "aeriometallurgical" process for SCFE of metals from a wide range of sources.

FIG. 1 includes the following features as part of the aeriometallurgical SCFE process:

1—Solvent/chelating agent

2—Solvent pump (transfers co-solvent or chelating agent into the extraction chamber and controls the flow rate of co-solvent or chelating agent into the system)

3—Solvent valve (on/off control for co-solvent or chelating agent flow)

4—Pressure indicator and Rupture Disc (measures pressure inside the reactor and provides overpressure protection for the system)

5—Liquid $CO_2$

6—$CO_2$ shut off valve (on/off control for liquid $CO_2$ flow)

7—Supercritical $CO_2$ pump (transfers liquid $CO_2$ into the extraction chamber, while pressurizing to ensure supercritical conditions within the chamber. Measures the pressure inside the reactor. Controls flow rate of liquid $CO_2$ to the chamber, providing an on/off control for liquid $CO_2$ flow, and provides cooling to ensure $CO_2$ stays in the liquid phase during pumping)

8—$CO_2$ valve (optional, on/off control for liquid $CO_2$ flow)

9—Reaction chamber (contains sample, supercritical fluid, chelating agent and/or co-solvent during the extraction process)

10—Heating jacket (provides heating to the extraction chamber to maintain temperature control during the extraction process)

11—Motor (drives the magnetic agitator)

12—Magnetic agitator (provides mixing and mechanical forces within the extraction chamber during the extraction process)

13—Inside thermocouple (measures temperature within the extraction chamber)

14—Reactor controller (controls the temperature both inside and on the surface of the extraction chamber, controls the agitation rate, and provides power to heating jacket and motor)

15—Skin thermocouple (measures surface/skin temperature on the outside of the extraction chamber)

16—Static/dynamic valve (on/off control for gasified $CO_2$, chelated agent flow and/or co-solvent flow exiting the extraction chamber)

17—Restrictor valve (controls the flow rate of gasified $CO_2$, chelated agent flow and/or co-solvent flow exiting the extraction chamber)

18—Valve heater (provides heating to both static/dynamic valve and restrictor valve)

19—EPA vial (vessel for the collection and containment of chelated agent and/or co-solvent. Provides connection from the outlet of restrictor valve to the vent line)

20—Vent line (line for venting gasified $CO_2$ and residue chemicals in the gasified $CO_2$)

A known amount of sample along with chelating agent 1 is loaded into the reactor chamber 9. After closing the reactor chamber 9, liquid $CO_2$ 5 is pumped into the system with both restrictor valve 17 and static/dynamic valve 16 closed until the desired pressure is reached. Heating is provided by and maintained through the electric heating jacket 10 surrounding the reactor chamber 9 until the desired temperature is reached. Soluble rare earth complex formed during the reaction is collected in the EPA vial 19 by opening both restrictor valve 17 and static/dynamic valve 16 upon reaching the designated extraction time.

Preferred Embodiment 1: Extraction of Rare Earth Elements from Hybrid Electric Vehicle Batteries The present invention relates to the development of an efficient and sustainable process for the urban mining of rare earth elements from waste electrical and electronic equipment, such as nickel metal hydride batteries. In one preferred embodiment, the developed process relies on supercritical fluid extraction utilizing $CO_2$ as the solvent, which is inert, safe, and abundant. This process is efficient in a sense that it is safe, runs at low temperature, and does not produce hazardous waste, while recovering preferably up to about 90% of rare earth elements.

Furthermore, the present invention provides a mechanism for the supercritical fluid extraction of rare earth elements, where are considered a trivalent rare earth element state bonded with three tri-n-butyl phosphate (TBP) molecules and three nitrates model for the extracted rare earth tri-n-butyl phosphate complex. The supercritical fluid extraction process has the advantage of waste valorization without utilizing hazardous reagents, minimizing the negative impacts of process tailings.

Unlike previous studies which have focused on pure REE oxides or their mixture, the present invention provides a process for the SCFE of REEs from postconsumer commercial products, such as real anode material of a HEV battery. In one preferred aspect, there is provided an innovative process on the basis of SCFE (sc-CO$_2$) to extract REEs from the anode materials of an end-of-life NiMH from a HEV. To systematically enhance the extraction process, two different TBP(HNO$_3$)$_x$(H$_2$O)$_y$ chelating agents were synthesized and tested under various operating conditions in terms of temperature, pressure, solid to chelating agent ratio (S:CA), residence time, and agitation rate, with and without co-solvent (methanol) addition, to determine optimal operating conditions. The present invention can provide environmentally sustainable urban mining of REEs from WEEE, such as NIMH batteries.

Experimental Section for Preferred Embodiment 1

Figure 2:
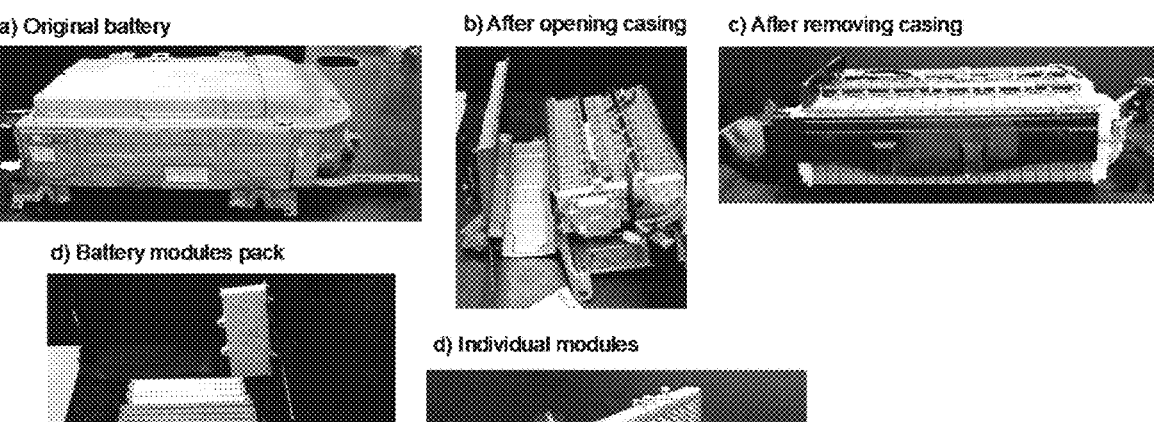
FIG. 2: The process steps of dismantling a hybrid electric vehicle (HEV) battery.
Figure 3:
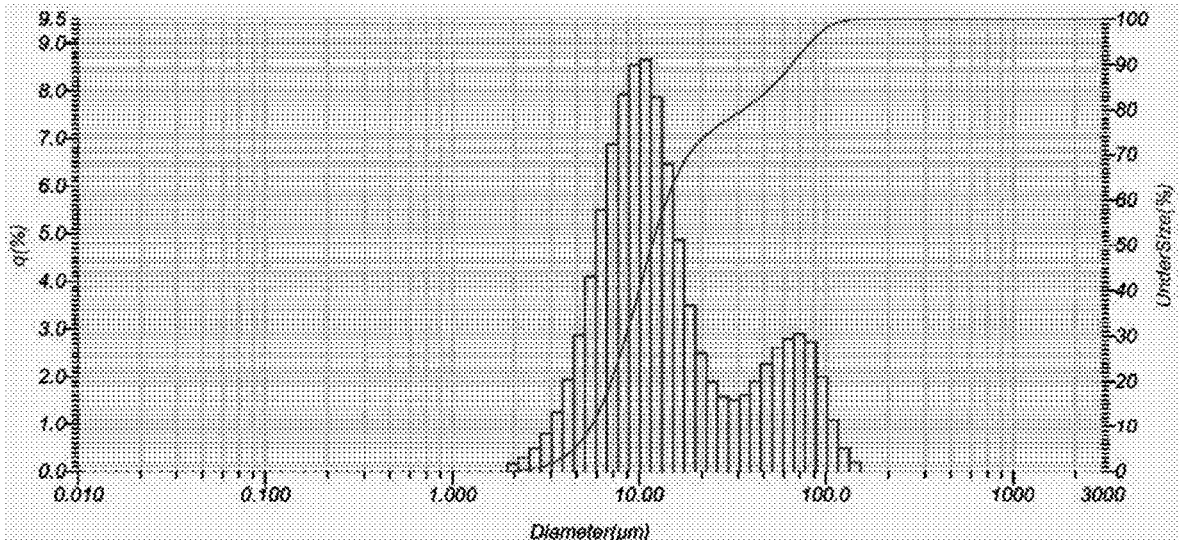
FIG. 3: Graph showing Particle size analysis (PSA) results for original anode material of NiMH battery. Particle size distribution of original anode material, median particle size is 11.7 μm and mean particle size is 22.96 μm.

Chemicals and materials. Tri-n-butyl phosphate (TBP, ≤100%), concentrated nitric acid (15.7 M, 70 w/w %), concentrated sodium hydroxide (19.4, 50 w/w %), phenolphthalein (solution 1% in alcohol), and lanthanum oxide (La$_2$O$_3$, 99.99%) were purchased from VWR™. Cerium oxide (CeO$_2$, 99.9%), praseodymium oxide (Pr$_6$O$_{11}$, 99.9%), and neodymium oxide (Nd$_2$O$_3$, 99.9%) were purchased from Sigma-Aldrich™. Carbon dioxide (CO$_2$, grade 5.0) to be used as solvent was purchased from Linde Canada™, and methanol (CH$_3$OH, HPLC, 99.9%) to be used as optional co-solvent was purchased from Fisher Chemical™. The battery (2012 Toyota Prius™ model C) was utilized as the feed. Anode samples to be used as source were retrieved from the battery by removing the casing and sawing into the individual modules. FIG. 2 illustrates the dismantling process steps. All anode samples were ground using mortar and pestle prior to SCFE. The mean particle size of the anode material was determined to be 11.7 μm. FIG. 3 presents the particle size analysis (PSA) results.

Preparation of TBP-HNO$_3$ complex. TBP-HNO$_3$ complexes to be used as chelating agents were prepared by vigorously mixing TBP with two different concentrations of HNO$_3$ (10.4 M, 50 w/w % and 15.7 M, 70 w/w %) for 5 min in a separatory funnel followed by gravity separation for 5 min. The upper organic phase was the TBP-HNO$_3$ complex. The concentration of HNO$_3$ in the TBP-HNO$_3$ complex was determined by acid-base titration with 0.1 M NaOH. The water content was measured by Karl Fischer titration using a C20 instrument (Mettler Toledo International Inc.). The density of the TBP-HNO$_3$ complex was calculated by weighing a known sample volume in triplicate runs with a TLE303E balance (Mettler Toledo International Inc.). Combining density, water content, and acid concentration data, the TBP-HNO$_3$ complex was fully characterized.

Experimental design. The process flow diagram for SCFE used in this experiment is presented in FIG. 1. The 100-mL high pressure rated reactor 9, magnetic drive mixer 12, reactor controller 14, constant flow dual piston pump 7, and solvent pump 2 were manufactured by Supercritical Fluid Technology Inc., USA.

SCFE process. A known amount of anode material or synthetic anode along with TBP-HNO$_3$ was loaded into the reactor chamber 9. After closing the reactor head, liquid CO$_2$ was pumped into the system with both restrictor valve 17 and static/dynamic valve 16 closed until the desired pressure was reached. Heating was provided by and maintained through the electric heating jacket 10 surrounding the reactor chamber 9 until the desired temperature was reached. Soluble rare earth complex formed during the reaction was collected in the EPA vial 19 by opening both restrictor valve 17 and static/dynamic valve 16 upon reaching the designated extraction time. Reproducibility tests (three independent experiments) showed that the experimentally measured data are accurate to within +5%.

In the experiments where methanol was added as co-solvent, the amount was calculated on the basis of total number of moles of CO$_2$ in the reactor 9. Considering methanol has a higher critical temperature compared with liquid CO$_2$ (240° C. vs. 31.1° C.), 2 mol % concentration was chosen. The formula to calculate volume of methanol is as follows:

$$V_{CH_3OH} = \left(2\% \times \frac{V_{CO_2}\rho_{CO_2}}{MW_{CO_2}}\right) \times \frac{MW_{CH_3OH}}{\rho_{CH_3OH}} \tag{1}$$

The density of supercritical CO$_2$ was obtained from National Institute of Standards and Technology (NIST) database: 871.22 kg/m$^3$ at 35° C. and 20.7 MPa, and 934.19 kg/m$^3$ at 35° C. and 31.0 MPa.

Characterization of the Test Specimen

Aqua Regia Digestion and ICP-OES Characterization

To determine the concentration of REEs in the unprocessed and extracted samples, aqua regia digestion was performed at 200° C., using an Ethos EZ Microwave Digestion System™, followed by inductively coupled plasma optical emission spectroscopy (ICP-OES) (PerkinElmer Optima 8000™). Four independent experiments were conducted to determine the average concentration of REEs in the unprocessed samples. Three independent dilutions were conducted to determine the average concentration of REEs in the extracted samples.

The extraction efficiency (E) is defined as follows:

$$E = \frac{\text{wt\% in unprocessed sample} - \text{wt\% in extracted sample}}{\text{wt\% in unprocessed sample}} \times 100\% \tag{2}$$

Morphological, mineralogical and particle size analysis. Morphological characterization of the unprocessed and extracted samples was performed using scanning electron microscopy energy dispersive spectroscopy (SEM-EDS, Hitachi SU8230™). The mineralogical characterization of the sample was performed using X-ray diffraction (XRD, Philips PW1830™). The particle size of the anode sample was determined using a laser particle size analyzer (Horiba Partica LA-950™).

Results and Discussion

Characterization of the anode material. The chemical composition of the anode material was characterized by ICP-OES after aqua regia digestion of the samples. Four REEs were identified: lanthanum (La), cerium (Ce), praseodymium (Pr), and neodymium (Nd). The total REE weight percent in the sample was approximately 30 wt % (FIG. 4a). The major impurities were nickel (Ni), manganese (Mn), cobalt (Co), and aluminum (Al) (FIG. 4a). The crystal structure of the anode material was analyzed by X-ray diffraction (XRD) and (Ce$_{0.47}$La$_{0.34}$Nd$_{0.14}$Pr$_{0.05}$) Ni$_{3.56}$Co$_{0.75}$Al$_{0.29}$Mn$_{0.4}$, a mischmetal-nickel alloy was detected as the only phase (FIG. 4b). The XRD result confirms the anode material is in its AB$_5$ form, where A is La, Nd, Ce, and Nd, and B is Ni, Co, Al and Mn. The surface morphology and elemental mapping of the anode material was characterized using SEM (FIG. 4c). Backscattered secondary electron (BSE) image and EDS elemental mapping of an anode particle cross-section are presented in FIG. 4d-m, which results are consistent with the ICP-OES results.

Characterization of TBP-HNO$_3$ complexes. Two TBP-HNO$_3$ complexes were characterized using the method described in the experimental section. The one with 70% w/w nitric acid was identified to be TBP(HNO$_3$)$_{1.745}$ (H$_2$O)$_{0.52}$.

Establishing baseline operating conditions. Main parameters that could affect the extraction efficiency include but are not limited to temperature, pressure, residence time, agitation rate, sample to chelating agent ratio (S:CA), type of the chelating agent and presence of co-solvent (methanol). The baseline conditions were established at temperature of 35° C., pressure of 20.7 MPa, residence time of 1 h, agitation rate of 750 rpm, S:CA of 1:5 (w/v, 1 g to 5 mL), with TBP(HNO$_3$)$_{1.171}$ (H$_2$O)$_{0.384}$ chelating agent and no co-solvent added.

Determining Optimum Operating Conditions.

To determine the optimum operating conditions that yield maximum REE extraction efficiency in this preferred the extraction results in Table 1, increasing all the parameters had a positive effect on the extraction efficiency with the exception of S:CA ratio with negligible effect (run 3) and temperature with negative effect (run 2). Third, all individual parameters with positive effects on REE extraction were combined to examine the extraction efficiency for an overall enhanced extraction process with and without methanol addition (2 mol %) (Table 1, run 8 and 10). The overall enhanced run with 2 mol % methanol addition resulted in the highest extraction efficiency (La: 79%, Ce: 77%, Pr: 83%, Nd: 69%) (Table 1, run 10). Fourth, to prevent oversaturating the system and further enhancing the extraction efficiency of all REEs, we decreased the anode sample size of the overall enhanced run by half (from 1 g to 0.5 g), which was identified as the optimized run (Table 1, run 11). Lastly, a mixture of pure rare earth oxides (REOs) were processed under the optimized conditions with and without 2 mol % methanol addition to assess the efficacy of the developed SCFE process for a synthetic anode material (Table 1, run 12 and 13).

TABLE 1

An overview of the experimental runs with corresponding processing parameters and extraction efficiencies for La, Ce, Pr, and Nd

Figure 5:
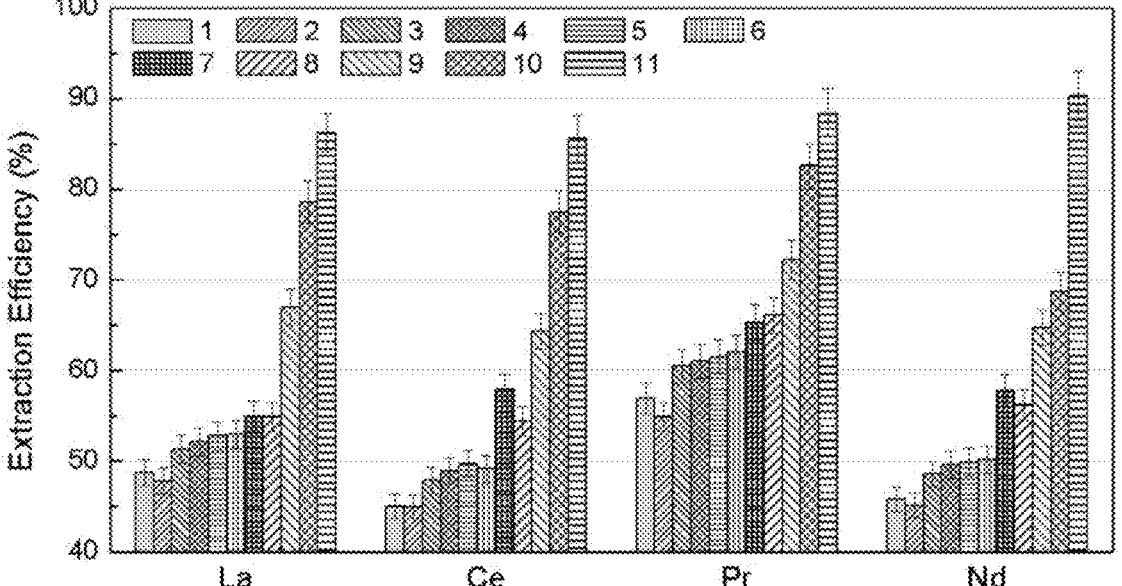
FIG. 5: Graph showing extraction efficiency for lanthanum (La), cerium (Ce), praseodymium (Pr), and neodymium (Nd) from NiMH battery under various operating conditions. Error bars represent the standard error of the mean for three replicates. Run 1—baseline, run 2—temperature increase, run 3—S:CA increase, run 4—agitation increase, run 5—residence time increase, run 6—pressure increase, run 7—stock acid complex, run 8—overall enhanced, run 9—baseline with methanol, run 10—overall enhanced with methanol, run 11—optimized.

| Run # | Run Name | Temperature (° C.) | Pressure (MPa) | Time (h) | S:CA (g:mL) | Agitation Rate (rpm) | Chelating agent | Methanol Addition | Extraction Efficiency for La, Ce, Pr, Nd (%) |
|---|---|---|---|---|---|---|---|---|---|
| 1 | Baseline | 35 | 20.7 | 1 | 1:5 | 750 | TBP(HNO$_3$)$_{1.171}$ (H2O)$_{0.384}$ | No | 49, 45, 58, 45 |
| 2 | Temperature increase | 55 | 20.7 | 1 | 1:5 | 750 | TBP(HNO$_3$)$_{1.171}$ (H2O)$_{0.384}$ | No | 48, 45, 56, 45 |
| 3 | S:CA increase | 35 | 20.7 | 1 | 1:10 | 750 | TBP(HNO$_3$)$_{1.171}$ (H2O)$_{0.384}$ | No | 51, 48, 61, 48 |
| 4 | Agitation increase | 35 | 20.7 | 1 | 1:5 | 1500 | TBP(HNO$_3$)$_{1.171}$ (H2O)$_{0.384}$ | No | 52, 49, 62, 49 |
| 5 | Residence time increase | 35 | 20.7 | 2 | 1:5 | 750 | TBP(HNO$_3$)$_{1.171}$ (H2O)$_{0.384}$ | No | 53, 50, 62, 49 |
| 6 | Pressure increase | 35 | 31.0 | 1 | 1:5 | 750 | TBP(HNO$_3$)$_{1.171}$ (H2O)$_{0.384}$ | No | 53, 50, 63, 50 |
| 7 | Stock acid complex | 35 | 20.7 | 1 | 1:5 | 750 | TBP(HNO$_3$)$_{1.745}$ (H2O)$_{0.52}$ | No | 58, 57, 68, 58 |
| 8 | Overall enhanced | 35 | 31.0 | 2 | 1:5 | 1500 | TBP(HNO$_3$)$_{1.745}$ (H2O)$_{0.52}$ | No | 56, 54, 65, 55 |
| 9 | Baseline methanol | 35 | 20.7 | 1 | 1:5 | 750 | TBP(HNO$_3$)$_{1.171}$ (H2O)$_{0.384}$ | Yes | 67, 65, 73, 64 |
| 10 | Overall enhanced methanol | 35 | 31.0 | 2 | 1:5 | 1500 | TBP(HNO$_3$)$_{1.745}$ (H2O)$_{0.52}$ | Yes | 79, 77, 83, 69 |
| 11 | Optimized | 35 | 31.0 | 2 | 1:10 | 1500 | TBP(HNO$_3$)$_{1.745}$ (H2O)$_{0.52}$ | Yes | 86, 86, 88, 90 |
| 12 | Synthetic anode | 35 | 31.0 | 2 | 1:10 | 1500 | TBP(HNO$_3$)$_{1.745}$ (H2O)$_{0.52}$ | No | 30, 73, 61, 73 |
| 13 | Synthetic anode methanol | 35 | 31.0 | 2 | 1:10 | 1500 | TBP(HNO$_3$)$_{1.745}$ (H2O)$_{0.52}$ | Yes | 86, 61, 78, 90 | embodiment, a systematic investigation was performed. First, using the baseline conditions, we obtained 49% La, 45% Ce, 58% Pr, and 45%, Nd extraction efficiency, as presented in Table 1 (run 1). Second, the effect of each individual process parameter on the REE extraction efficiency was investigated by only changing that single parameter compared with the baseline conditions (Table 1, run 2-7 and 9), where in run 9, 2 mol % methanol was added as a co-solvent to enhance the extraction process. On the basis of Effect of process parameter on REE extraction efficiency. The effect of increasing each operating parameter on REE extraction efficiency was investigated with respect to the baseline conditions. As can be seen in FIG. 5 (run 2), increasing temperature resulted in lower REE extraction efficiency, whereas increasing pressure increased the REE leaching efficiency (FIG. 5, run 6). The relationship between the solubility of a solute in a SCF and the density is described by Chrastil model (Eq. 3):

$$lnS = kln\rho + \frac{A}{T} + B \qquad (3)$$

where, S (g/L) is the solubility of a solute in supercritical fluid; $\rho$ (g/L) is the density of the supercritical fluid; k is the association number that describes the number of solvent molecules associated with the complex; T is the temperature in K; A and B are empirical parameters.

Because increasing temperature at constant pressure decreases the density $\rho$ and A/T term in Eq. 1, it decreases the solubility of the solute, thus decreasing the extraction efficiency.

On the contrary, increasing pressure at constant temperature increases the density as more $CO_2$ is pumped into the system, thus it increases the solubility, and therefore, the extraction efficiency. Furthermore, increasing pressure improves the penetration of sc-$CO_2$ into deeper pores of the anode material, which ultimately resulted in higher degree of complexation.

Increasing the residence time from 1 h to 2 h increased the leaching efficiency (FIG. 5, run 5) because a longer residence time allows for the reaction to proceed towards completion, leading to higher REE extraction efficiency.

Increasing the agitation rate increased the leaching efficiency because it increased the turbulency of the system and the surface contact between the chelating agent and the sample (FIG. 5, run 4).

A chelating agent with higher acid content, i.e., TBP $(HNO_3)_{1.745}$ $(H_2O)_{0.52}$, compared with TBP$(HNO_3)_{1.171}$ $(H_2O)_{0.384}$, resulted in higher extraction efficiency, because it improved the formation of REE-TBP nitrate complex, as more $HNO_3$ was available (FIG. 5, run 7). It should be mentioned that the molar acid content in the TBP $(HNO_3)_{1.745}$ $(H_2O)_{0.52}$ adduct is only 1.745 times higher than TBP. Previous studies indicate that higher acid content in the chelating agent does not necessarily produce the highest extraction efficiency.

The amount of the chelating agent that is dissolvable in sc-$CO_2$ is capped under certain conditions, and once this limit is reached, a further increase in volume of the chelating agent does not improve the REE extraction efficiency, as demonstrated by run 3 in FIG. 5.

The effect of adding a co-solvent on the extraction efficiency was investigated. 2 mol % methanol was chosen as the co-solvent and observed an increase in the extraction efficiency (FIG. 5, run 9-11). The main reason behind the addition of methanol is that sc-$CO_2$ is non-polar, thus it has low solvating power for polar compounds. The dissolution of chemical compounds in SCFs depends on the relative strength of the solute/solute and solute/solvent molecular interactions. Addition of a small amount of a polar co-solvent, such as methanol, improves dipolarity/polarizability and hydrogen bond acceptor basicity of the solvent, thus significantly improving the solvation power of sc-$CO_2$/co-solvent mixtures, enhancing the extraction efficiency.

Figure 6:
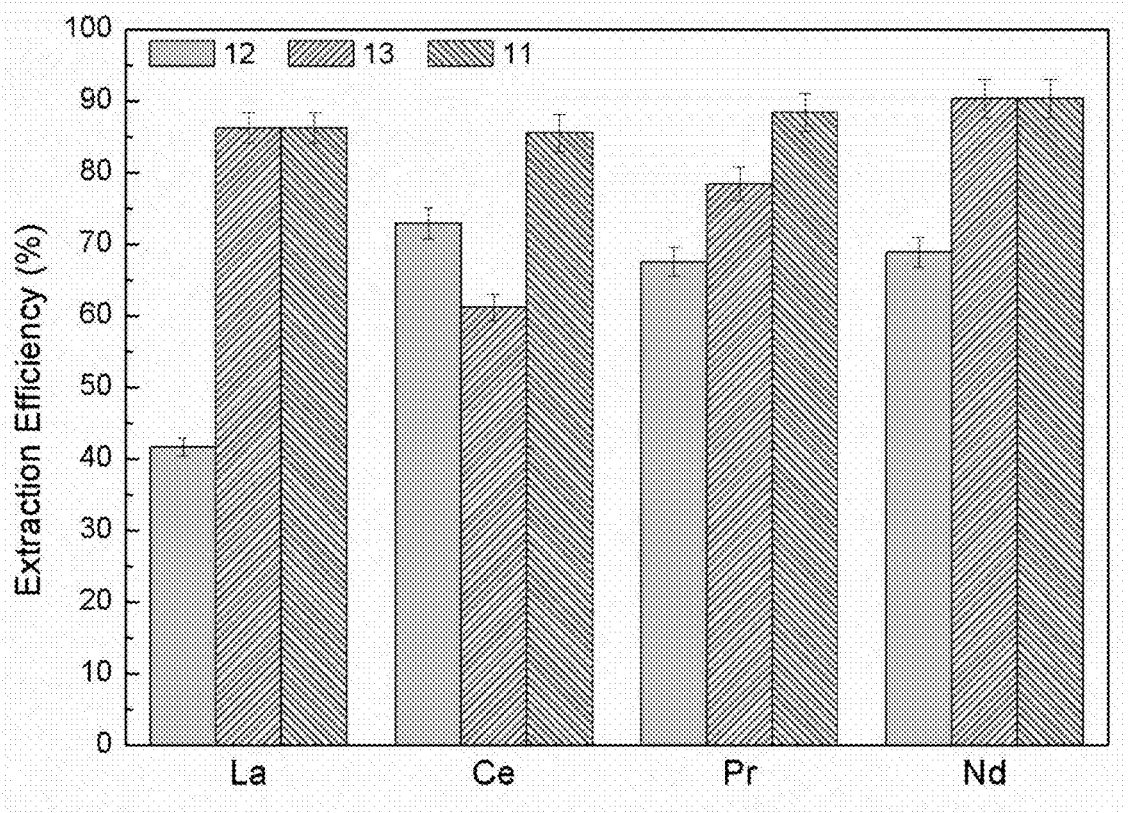
FIG. 6: Graph showing REE extraction from synthetic anode using sc-$CO_2$ with and without methanol addition in comparison with that of actual NiMH anode material in the optimized run. Error bars represent the standard error of the mean for three replicates. Run 11—actual anode material optimized conditions, run 12—synthetic anode without methanol, run 13—synthetic anode with methanol.

Comparison between REE extraction from synthetic and actual NiMH anode material. Also investigated was the extraction efficiency of REEs from a synthetic mixture of oxides of cerium, lanthanum, neodymium, and praseodymium, in the same ratio as that in the actual anode material (0.5 g sample size). To calculate the extraction efficiency, REE wt % in unprocessed synthetic anode was determined to be 51.3% La, 15.3% Ce, 9.5% Pr, and 5.9% Nd. The normalized REE wt % in the synthetic anode material were 62.6% La, 18.6% Ce, 11.6% Pr, and 7.2% Nd, which are very close to those in the actual anode material (60.4% La, 24.5% Ce, 8.1% Pr, and 7.0% Nd). Two separate experimental runs were performed: one without and one with 2 mol % methanol addition (FIG. 6, run 12 and 13, respectively). Extraction results from the synthetic anode were compared with those from the optimized run of the actual anode material (FIG. 6, run 11). The synthetic anode with 2 mol % methanol reached the same level of extractions for La and Nd and lower for Ce and Pr compared with the actual anode material. Furthermore, contrary to other cases studied here, the extraction efficiency of Ce from the synthetic anode with methanol was lower than that without methanol. This discrepancy could possibly be attributed to the +4 oxidation state of Ce versus+3 for La and Nd. It is possible that methanol may have a negative effect on the extraction of cerium (IV) oxide.

Figure 4:
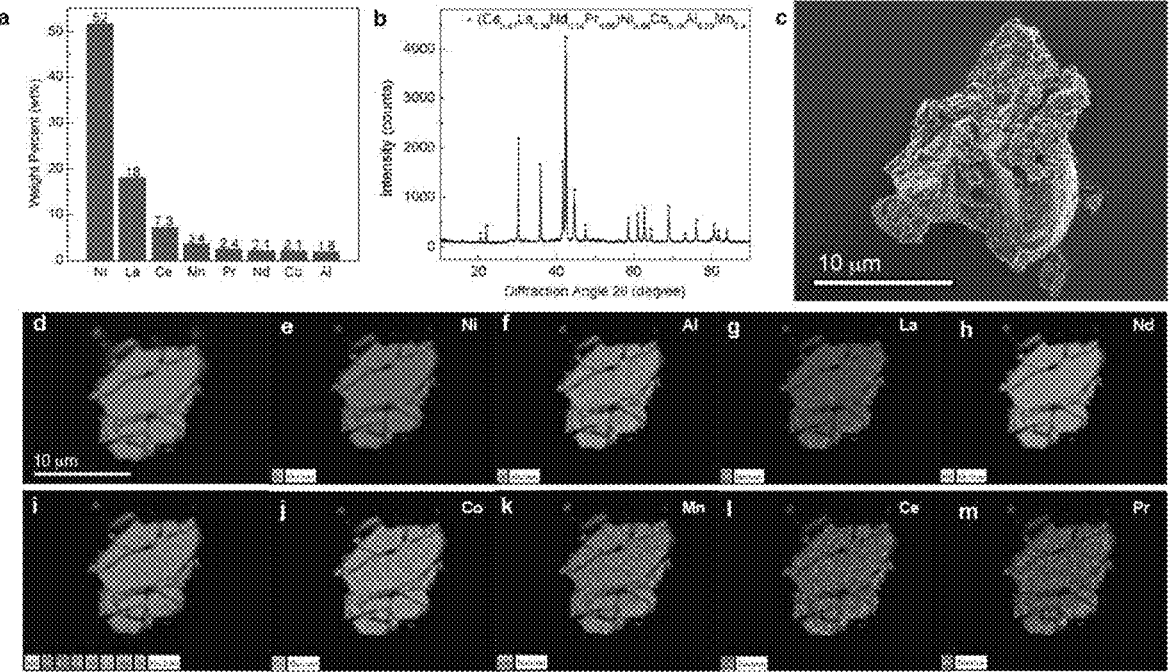
FIG. 4: NiMH battery anode material characterization results: (a) Aqua regia digestion—ICP-OES results indicating REEs composition; (b) X-ray diffractogram; (c) SEM image of the anode particle; bright regions indicate the high atomic number REEs; (d)-(m) Backscattered secondary electron (BSE) image and EDS elemental mapping of the anode particle cross-section.
Figure 7:
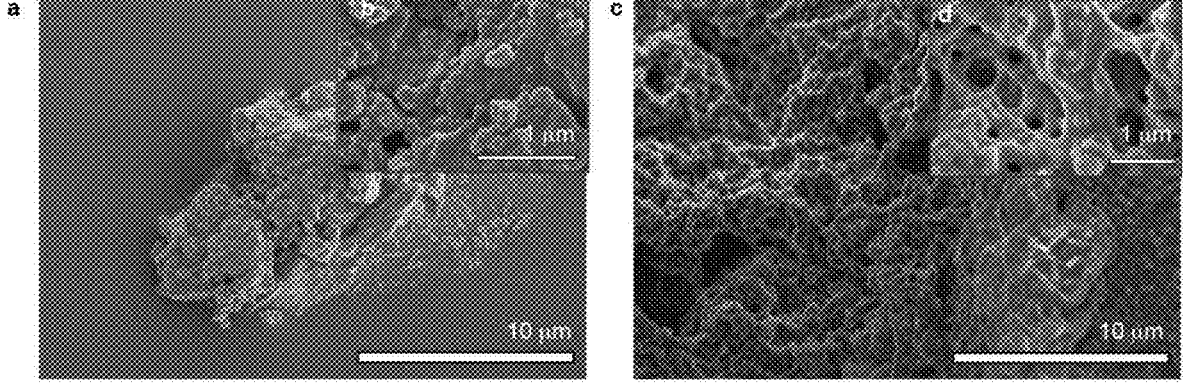
FIG. 7: (a) SEM image of unprocessed NiMH battery anode sample; (b) high magnification SEM image of unprocessed anode sample; (c) SEM image of the anode sample after extraction; (d) high magnification SEM image of the anode sample after extraction.

Characterization of anode material before and after SCFE. Elemental mapping identifies large amounts of REEs on the surface of the anode material (FIG. 4, d-m). After extraction, a significant evolution in the surface morphology was observed using SEM (FIG. 7, a-d). The unprocessed anode sample displayed powder-like structure with a mean particle size of 11 μm (FIG. 3). The unprocessed anode material has agglomerated particles with smooth surfaces, whereas the extracted anode particles are highly porous. Channel-like structures appear on the surface of the anode material after extraction with pores smaller than 1 μm in diameter distributed throughout the surface (FIG. 7, c-d). This suggests that REEs were successfully extracted out of the anode matrix.

Figure 8:
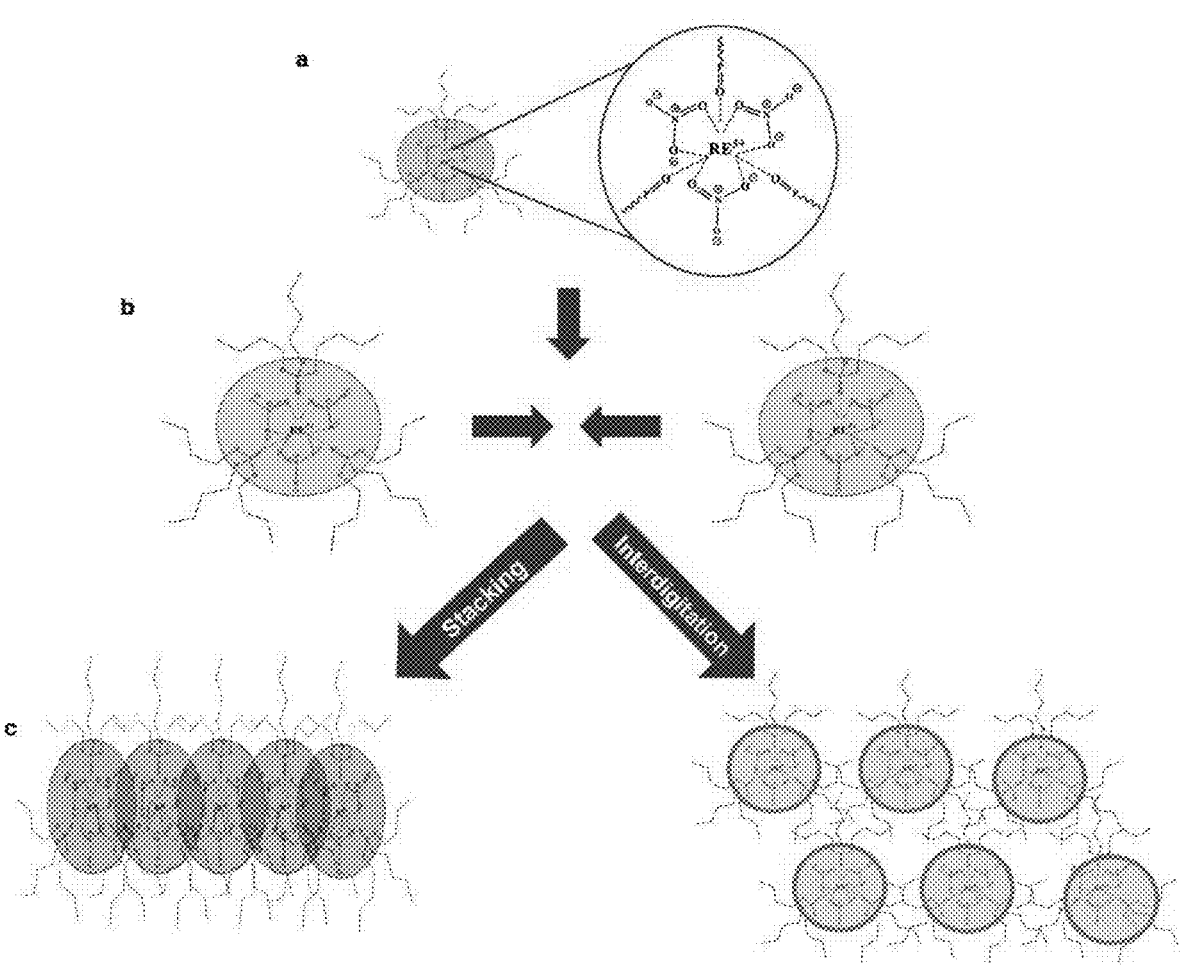
FIG. 8: Spherical reverse micellar mechanism proposed for REE extraction from spent NiMH battery anode material using sc-$CO_2$ including: (a) 9-oxygen coordinate chemistry of the lanthanide cation; (b) lipophilic interactions between aliphatic chains between micelles; and (c) formation of super aggregates as either stable chains from micellar stacking or randomly adhered spheres via interdigitation.

Exploring the mechanism of REE extraction using sc-$CO_2$. We propose a possible molecular mechanism for the recovery of REEs from spent NiMH battery anode material using TBP-$HNO_3$ as an extracting agent in sc-$CO_2$. Based on our proposed mechanism, bidentate nitrate anions from the TBP-$HNO_3$ extractant chelate to the $Ln^{3+}$ cation, forming neutral lanthanide nitrates Ln $(NO_3)_3$. Hydrophobic effects from aliphatic tails and dipole-dipole interactions between phosphate head-groups of TBP molecules promote the formation of reverse micelles, whereby, upon contact with the sample matrix, hydrophilic solutes, such as lanthanide salts, assimilate into their polar cores. Such coordination sites comply with the lanthanide metal geometry, and as a result, the cation is centered in a 9 O coordinate environment comprised of 3 bidentate nitrate anions and 3 TBP molecules (FIG. 8a). This agrees with the originally proposed TBP-trisolvate complexes of Ln (III) ions, which assumes all lanthanides have a coordination number of 9, suggesting that three TBP molecules are required to complete the coordination sphere. The presence of hydrated species in the organic phase could also interfere; however, 3 TBP molecules would significantly increase the solubility of the metal complex in non-polar sc-$CO_2$. A previous study considered a similar coordination chemistry for SCFE of lanthanide oxides with a TBP-$HNO_3$—$H_2O$ system: 3 nitrate anions for charge neutralization, but the number of TBP molecules varies, as shown in Eqs. (4) and (5), where n is a constant and Ln represents the lanthanide elements.

$$Ln_2O_3 + 6HNO_3 \rightarrow 2 \, Ln^{3+} + 6 \, NO_3^- + 3 \, H_2O \qquad (4)$$

$$Ln^{3+} + 3 \, NO_3^- + nTBP \rightarrow Ln(NO_3)_3(TBP)_n \qquad (5)$$

The following step involves the synergy between the reverse micelles that, upon incorporation of lanthanide ions and/or other hydrophilic species, attract and adhere to one another via hydrophobic interactions of aliphatic functionalities, as depicted in FIG. 8b. As this interaction exceeds a certain threshold, micellar condensation occurs representing the final step: a random aggregation of reverse micelles is possible with significant lipophilic interdigitation among the aliphatic chains, or, alternatively, there is formation of thermodynamically favorable micellar chains that are a result of stacking individual aliphatic shells into macroscopic assemblies and producing a more balanced higher-order structure (FIG. 8c).

Conclusions from Preferred Embodiment 1

Preferred Embodiment 1 provides an environmental friendly SCFE process to extract REEs from postconsumer NIMH batteries. The effect of several operating parameters, including temperature, pressure, residence time, sample to chelating agent ratio, agitation rate, complex chemistry, and co-solvent (methanol) addition, on the REE extraction efficiency was investigated, and 35° C., 31 MPa, 2 h residence time, S:CA ratio of 1:10, $TBP(HNO_3)_{1.745}$ $(H_2O)_{0.52}$ chelating agent with 2 mol % methanol addition were determined to be some of the preferred conditions for this embodiment, resulting in 86% La, 86% Ce, 88% Pr, and 90% Nd recovery.

Potential options to further increase the extraction efficiency include increasing pressure and/or residence time, decreasing S:CA ratio, and increasing methanol concentration. Furthermore, a synthetic anode material was prepared and processed utilizing pure REOs, which resulted in similar or lower REE extraction efficiency compared with the actual anode material, confirming the robustness of the developed process for the actual anode material. From an industrial point of view, SCFE mainly requires a high-pressure reactor for extraction and a depressurization tank for the separation of the products from recyclable $CO_2$. Because this process requires low content of chelating agent, it generates minimal hazardous waste. Furthermore, energy consumption of this process is significantly lower than that of a typical pyrometallurgical process.

With respect to Preferred Embodiment 1, the following conditions may preferably apply:
   the temperature in the reactor chamber is adjusted to a range of about 35 to 55° C.;
   the pressure in the reactor chamber is adjusted to a range of about 20.7 to 31 MPa;
   the source comprising the target metal, the chelating agent and the solvent are allowed to react in the reactor chamber for a residence time in a range of about 1 to 2 hours;
   the source-to-chelating agent ratio is in a range of about 0.1 to 0.2;
   the source comprising the target metal, the chelating agent and the solvent are subjected to an agitation rate in a range of about 750 to 1500 rpm;
   the chelating agent comprises $HNO_3$ in a concentration of about 10.4 to 15.7 M; and adding the methanol to the reactor chamber in an amount of about 0.01 to 2 mol %.
   Furthermore, the following conditions may be more preferable:
   the temperature in the reactor chamber is adjusted to about 35° C.;
   the pressure in the reactor chamber is adjusted to about 31 MPa;
   the residence time is about 2 hours;
   the source-to-chelating agent ratio is about 0.1;
   the agitation rate is about 1500 rpm;

the chelating agent comprises $HNO_3$ in a concentration of about 15.7 M; and
   adding the methanol to the reactor chamber in an amount of about 2 mol %.

Preferred Embodiment 2: Extraction of Rare Earth Elements from Permanent Magnets As mentioned above, the present invention relates to the development of an efficient and sustainable process for the urban mining of REEs from WEEE. In addition to NIMH batteries, another potential source of REEs are permanent magnets, which can be found in, for example, computer hard disk drives and wind turbines. As such, another preferred embodiment of the present invention relates to supercritical fluid extraction of metals, such as rare earth elements, from permanent magnets.

Experimental Section for Preferred Embodiment 2

Chemicals and materials. The following reagents were employed: Tri-n-butyl phosphate (TBP, ≥98%—from VWR™), concentrated nitric acid (15.7 M, 70 wt %—VWR™), concentrated hydrochloric acid (12.2 M, 37 wt %—VWR™), concentrated sodium hydroxide (19.4 M, 50 wt %—VWR™), phenolphthalein indicator solution (1% in alcohol—VWR™), neodymium oxide ($Nd_2O_3$, 99.9 wt %—Sigma Aldrich™), iron (III) oxide ($Fe_2O_3$, 99 wt %—Sigma Aldrich™), Iron (II) oxide (FeO, 99.5 wt %—Alfa Aesar™), neodymium (III) nitrate hexahydrate ($Nd(NO_3)_3 \cdot 6H_2O$ 99.9 wt %—Alfa Aesar™), carbon dioxide ($CO_2$, grade 4.0—Linde Canada™), methanol ($CH_3OH$, HPLC, 99.9 wt %—Fisher Chemical™), hexanes (ACS grade-Fisher Chemical™), and acetone (Reagent grade-Caledon Laboratory Chemicals™).

Figure 9:
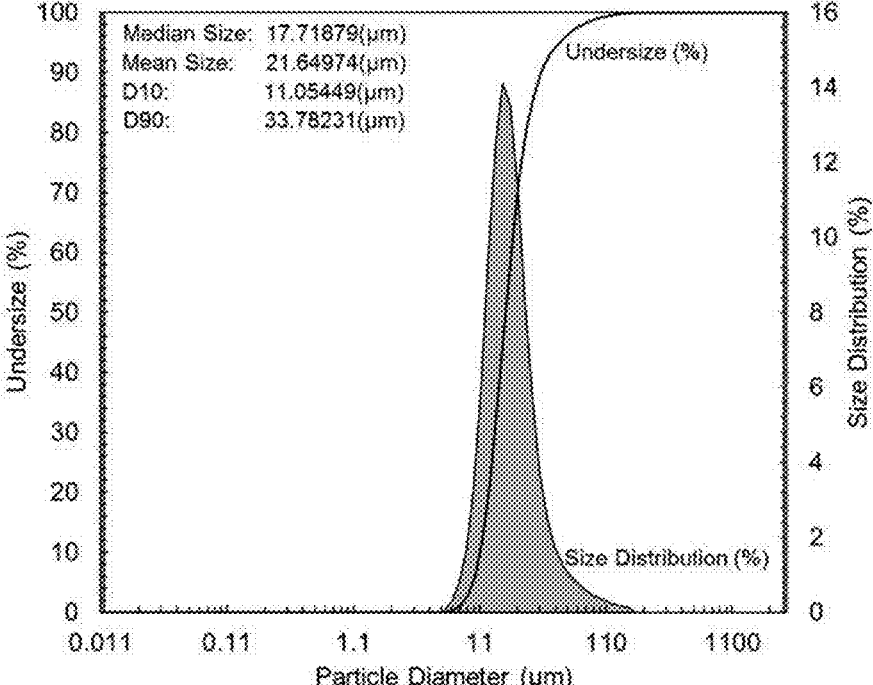
FIG. 9: Graph showing laser particle size analysis of the ground magnet powder.

Magnet Preparation. The grade N52 NdFeB magnet was purchased from CMS Magnetics™. The magnet was heated to 350° C. for one hour in a box furnace (CARBOLITE® HTF18/4) for demagnetization The Nickel-Copper-Nickel triple coating layer on the magnet was then removed with a Dremel 4000™ rotary tool. The demagnetized uncoated magnet was crushed and ground into fine particles using a roller mill. The particle size of the magnet particles was determined to be Median Size=17.7 μm, Mean Size=21.6 μm, D10=11.1 μm, D90=33.8 using a laser particle size analyzer (Horiba Partica LA-950™) (See FIG. 9).

Preparation of $TBP-HNO_3$ complexes. $TBP-HNO_3$ chelating agent complexes were synthesized by mixing TBP and $HNO_3$ solutions at either 10.4 M (50 wt %), 13.05 M (60 wt %), or 15.7 M (70 wt %)—corresponding to the three levels of test factor $X_6$ in the experimental design. The mixture was agitated manually in a separatory funnel for 5 min, then allowed to settle. The immiscible liquid phases were separated, with the upper organic phase corresponding to the $TBP-HNO_3$ chelating agent. The nitric acid content of the complex was determined by acid-base titration with 0.1 M NaOH solution and phenolphthalein indicator (n=3). The water content was determined by Karl Fischer titration (n=3) with a C20 Coulometer™ (Mettler Toledo™). Chelating agent density was determined directly by measuring the weight of a known volume of chelating agent sample. Combining the above data, the stoichiometry of the chelating agents was determined as the following: ($X_6$=−1: $TBP(H_2O)_{0.387}(HNO_3)_{1.224}$; $X_6$=0: $TBP(H_2O)_{0.405}(HNO_3)_{1.352}$; $X_6$=+1: $TBP(H_2O)_{0.560}(HNO_3)_{1.969}$). At the studied temperatures (35 to 55° C. for a maximum of two hours), the $TBP-HNO_3$ complex was expected to be stable. However, careful safety precautions must be taken while handling this system because in a pressure vessel, there is a risk of exothermic reactions between TBP and $HNO_3$. Depending on the pressure, acid concentration and residence time, the onset temperature for exothermic self-accelerating oxidation processes in TBP-$HNO_3$ mixtures is 117° C. and potentially lower depending if alcohols are present, which could result in hazardous reactions under certain reaction conditions. As such, particular care and caution must be taken to ensure that experiments are carried out within safe operating parameters.

Design of Experiment. The experimental parameter settings for these SCFE trials were constructed using Fractional Factorial Experimental Design methodology, with the goal of testing a large number of process parameters and developing an empirical model that describes the effect of each operating parameter on the extraction REEs in the system. The following operating parameters were investigated: temperature $(X_1)$, pressure $(X_2)$, residence time (duration) $(X_3)$, the sample: chelating agent (S:CA) ratio $(X_4)$ (g/mL), agitation rate $(X_5)$, $HNO_3$ concentration in the chelating agent $(X_6)$, and cosolvent additions (methanol in this case) $(X_7)$. The test levels were selected on the basis of the levels used in a study by the inventors on the sc-$CO_2$ extraction of REEs from NiMH batteries. The same levels were used for both studies to allow direct comparison between the two systems. The parameter settings $(x_i)$ were normalized and coded between −1 (low level) and +1 (high level), as the parameter coding allows for direct comparison of the relative impact of each parameter on the system response by direct comparison of the magnitude of the model coefficients. A summary of the levels associated to each of the test parameters is given in Table 2.

TABLE 2-continued

List of coded factor effects and their corresponding levels.

| Factor | Units | −1 Level | 0 Level | +1 Level |
|---|---|---|---|---|
| $X_3$: Duration | h | 1 | 1.5 | 2 |
| $X_4$: S:CA ratio | g/ml | 0.20 | 0.15 | 0.10 |
| $X_5$: Agitation rate | rpm | 750 | 1125 | 1500 |
| $X_6$: Chelating agent | M | 10.4 | 13.05 | 15.7 |
| $X_7$: Methanol addition | % | 0 | 1 | 2 |

Empirical model building and statistical methods. The results of the extraction experiments were utilized to build a set of empirical models to describe the extraction (Si) of the tested elements as a function of the seven experimental parameters $(X_1$ to $X_7)$ (Equations (1-2))

$$\hat{y}_i = \beta_0 + \beta_1 X_1 + \beta_2 X_2 + \beta_3 X_3 + \beta_4 X_4 + \beta_5 X_5 + \beta_6 X_6 + \beta_7 X_7 +$$
$$\beta_{24} X_2 X_4 + \beta_{14} X_1 X_4 + \beta_{15} X_1 X_5 + \beta_{12} X_1 X_2 + \beta_{13} X_1 X_3 +$$
$$\beta_{17} X_1 X_7 + \beta_{16} X_1 X_6 \qquad (1)$$

Where: (assuming 3rd order and higher interactions are negligible)

$$\tilde{\beta}_{24} = \beta_{24} + \beta_{35} + \beta_{67} \quad \tilde{\beta}_{14} = \beta_{14} + \beta_{36} + \beta_{57} \quad \tilde{\beta}_{15} = \beta_{15} + \beta_{26} + \beta_{47}$$
$$\tilde{\beta}_{12} = \beta_{12} + \beta_{37} + \beta_{56} \quad \tilde{\beta}_{13} = \beta_{13} + \beta_{27} + \beta_{46} \quad \tilde{\beta}_{17} = \beta_{17} +$$
$$\beta_{23} + \beta_{45} \quad \tilde{\beta}_{16} = \beta_{16} + \beta_{25} + \beta_{34} \qquad (2)$$

The experimental data was fit to this empirical model multiple Linear Least Squares Regression (mLLSR) according to Equation (3). $\hat{\beta}$ is the model parameter vector, containing each of the model parameters $(\hat{\beta}_0, \hat{\beta}_1, \hat{\beta}_2, \ldots )$, X is the experimental design matrix (See Table 3), and $Y_i$ is the response vector, containing each of the measured experimental extraction efficiencies.

$$\hat{\beta} = (X^T X)^{-1} (X^T Y_i) \qquad (3)$$

TABLE 3

Coded calculation matrix (X) used for empirical model building. The factors in the $1^{st}$ row are the design factors, and those in the $2^{nd}$ and $3^{rd}$ rows are the aliased factors ($3^{rd}$ order and above interactions were assumed to be negligible).

| Run ID | $X_0$ | $X_1$ | $X_2$ | $X_3$ | $X_4$ | $X_5$ | $X_6$ | $X_7$ | $X_2X_4$ $X_3X_5$ $X_6X_7$ | $X_1X_4$ $X_3X_6$ $X_5X_7$ | $X_1X_5$ $X_2X_6$ $X_4X_7$ | $X_1X_2$ $X_3X_7$ $X_5X_6$ | $X_1X_3$ $X_2X_7$ $X_4X_6$ | $X_1X_7$ $X_2X_3$ $X_4X_5$ | $X_1X_6$ $X_2X_5$ $X_3X_4$ |
|---|---|---|---|---|---|---|---|---|---|---|---|---|---|---|---|
| 1 | 1 | −1 | −1 | −1 | 1 | 1 | 1 | −1 | −1 | −1 | −1 | 1 | 1 | 1 | −1 |
| 2 | 1 | 1 | −1 | −1 | −1 | −1 | 1 | 1 | 1 | −1 | −1 | −1 | −1 | 1 | 1 |
| 3 | 1 | −1 | 1 | −1 | −1 | 1 | −1 | 1 | −1 | 1 | −1 | −1 | 1 | −1 | 1 |
| 4 | 1 | 1 | 1 | −1 | 1 | −1 | −1 | −1 | 1 | 1 | −1 | 1 | −1 | −1 | −1 |
| 5 | 1 | −1 | −1 | 1 | 1 | −1 | −1 | 1 | −1 | −1 | 1 | 1 | −1 | −1 | 1 |
| 6 | 1 | 1 | −1 | 1 | −1 | 1 | −1 | −1 | 1 | −1 | 1 | −1 | 1 | −1 | −1 |
| 7 | 1 | −1 | 1 | 1 | −1 | −1 | 1 | −1 | −1 | 1 | 1 | −1 | −1 | 1 | −1 |
| 8 | 1 | 1 | 1 | 1 | 1 | 1 | 1 | 1 | 1 | 1 | 1 | 1 | 1 | 1 | 1 |
| 9 | 1 | 0 | 0 | 0 | 0 | 0 | 0 | 0 | 0 | 0 | 0 | 0 | 0 | 0 | 0 |
| 10 | 1 | 0 | 0 | 0 | 0 | 0 | 0 | 0 | 0 | 0 | 0 | 0 | 0 | 0 | 0 |
| 11 | 1 | 0 | 0 | 0 | 0 | 0 | 0 | 0 | 0 | 0 | 0 | 0 | 0 | 0 | 0 |
| 12 | 1 | 1 | 1 | 1 | −1 | −1 | −1 | 1 | −1 | −1 | −1 | 1 | 1 | 1 | −1 |
| 13 | 1 | −1 | 1 | 1 | 1 | 1 | −1 | −1 | 1 | −1 | −1 | −1 | −1 | 1 | 1 |
| 14 | 1 | 1 | −1 | 1 | 1 | −1 | 1 | −1 | −1 | 1 | −1 | −1 | 1 | −1 | 1 |
| 15 | 1 | −1 | −1 | 1 | −1 | 1 | 1 | 1 | 1 | 1 | −1 | 1 | −1 | −1 | −1 |
| 16 | 1 | 1 | 1 | −1 | −1 | 1 | 1 | −1 | −1 | −1 | 1 | 1 | −1 | −1 | 1 |
| 17 | 1 | −1 | 1 | −1 | 1 | −1 | 1 | 1 | 1 | −1 | 1 | −1 | 1 | −1 | −1 |
| 18 | 1 | 1 | −1 | −1 | 1 | 1 | −1 | 1 | −1 | 1 | 1 | −1 | −1 | 1 | −1 |
| 19 | 1 | −1 | −1 | −1 | −1 | −1 | −1 | −1 | 1 | 1 | 1 | 1 | 1 | 1 | 1 |

TABLE 2

List of coded factor effects and their corresponding levels.

| Factor | Units | −1 Level | 0 Level | +1 Level |
|---|---|---|---|---|
| $X_1$: Temperature | ° C. | 35 | 45 | 55 |
| $X_2$: Pressure | MPa | 20.7 | 25.85 | 31 |

SCFE process. Extraction experiments were carried out in a 100 mL high-pressure reactor system manufactured by Supercritical Fluid Technology Inc., USA™. Magnet material or synthetic oxide, along with TBP-$HNO_3$ was loaded into the reactor chamber prior to $CO_2$ injection, and increasing pressure and temperature to supercritical conditions. For all tests, the volume of chelating agent was fixed at 5 mL (for example, for a test with a S:CA of 0.2 g/mL, 1 g of magnet powder was utilized). After completion of reaction, rare earth complex formed during the reaction was separated by depressurizing and collecting the liquid chelating agent. In the experiments with methanol co-solvent addition, the amount was determined on a mass/mass basis, considering total number of moles of $CO_2$ in the reactor (Equation (4)). The density of supercritical $CO_2$ was obtained from the National Institute of Standards and Technology (NIST).

$$V_{CH_3OH} = \left( X_7\% \times \frac{V_{CO_2}\rho_{CO_2}}{MW_{co_2}} \right) \times \frac{MW_{CH_3OH}}{\rho_{CH_3OH}} \quad (4)$$

Characterization of the Test Specimens. Aqua Regia digestion and ICP-OES characterization. For determining the composition of magnet particles before and after SCFE, they were digested in concentrated aqua regia (3 HCl:1 $HNO_3$, approximately 20 mL per 0.25 g sample) at 200° C. (9° C./min ramp up, 20 min dwell at 200° C., 5° C./min ramp down—in a MARS6 Xpress™ microwave digestion system), followed by Inductively Coupled Plasma Optical Emission Spectrometry (Perkin Elmer Optima 7300 DV™) using the following wavelengths: Fe 238.204 nm, Nd 406.109 nm, Dy 353.170 nm, Pr 390.844 nm. Five independent digestion runs were conducted to determine the average concentration of REEs and Fe in the magnet powder feed. Prior to ICP-OES measurement, the digested samples were diluted to 50 mL total volume with DI water, filtered with a 0.45 μm polyethersulfone syringe filter (Sarstedt™), and diluted to the measurement concentration range (0.1-40 mg/L) with 5 wt % $HNO_3$. The measured values corresponded to the average of concentrations obtained from the three measured dilution levels.

Figure 10:
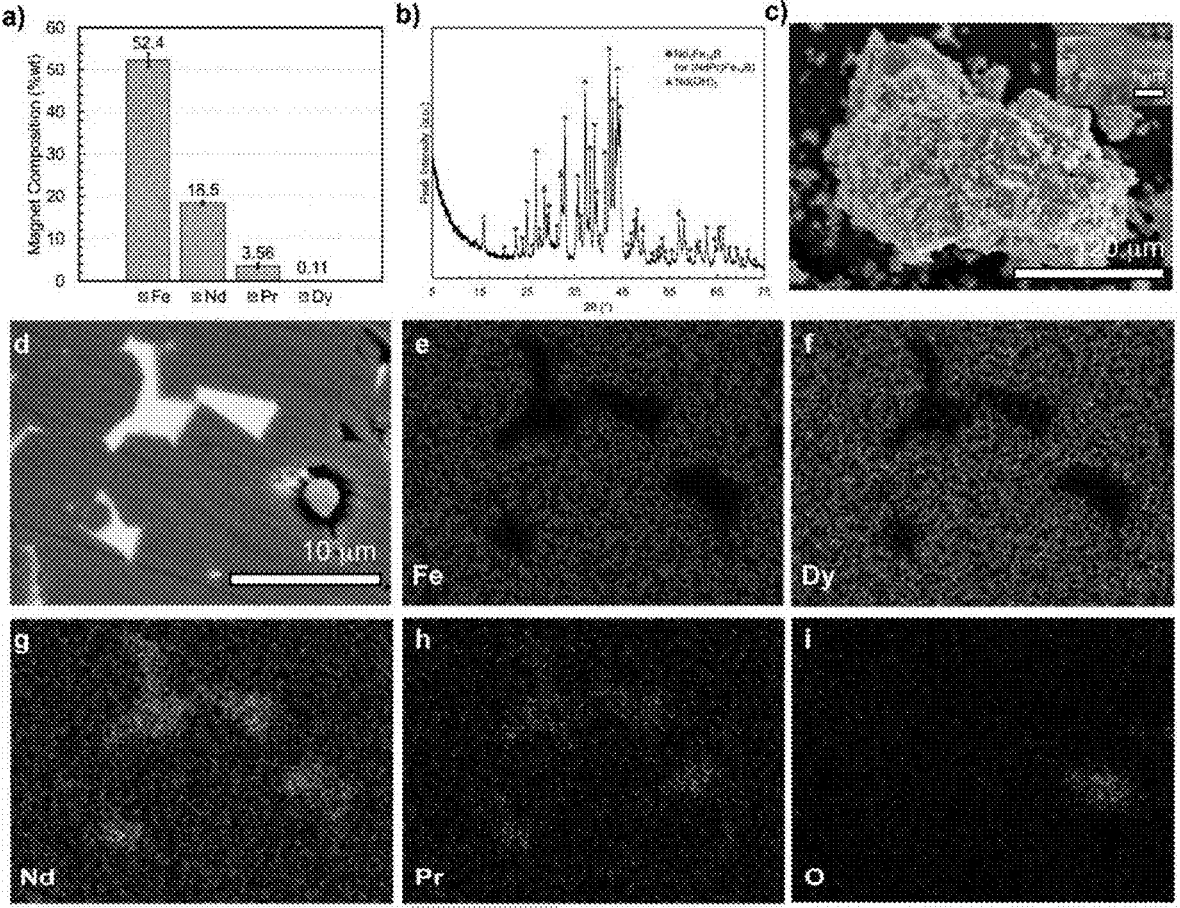
FIG. 10: Ground NdFeB magnet powder characterization results: (a) ICP-OES elemental analysis, error bars represent the sample standard deviation (nFe,Nd,Dy,Pr=5); (b) X-ray diffraction diffractogram; (c) Scanning electron micrograph (SEM) of the ground magnet particle; (d-i) Backscattered secondary electron (BSE) image and EDS elemental mapping of the magnet particle cross-section.

Characterization of ground NdFeB magnet powder. The chemical composition of the ground NdFeB magnet was analyzed with microwave assisted aqua regia digestion followed by inductively coupled plasma optical emission spectroscopy (ICP-OES). It was shown that the magnet comprises primarily Fe (52.4 wt %), Nd (18.5 wt %) and Pr (3.6 wt %) with a small amount of Dy (0.1 wt %), with an Fe:REE ratio of approximately 2.3:1 (See FIG. 10 (a)). This composition is slightly lower than other previously reported values; however, this quantification is based on the ground magnet powder, which may contain contaminants, such as $SiO_2$ from the grinding process. SEM-EDS point analysis of the individual phases present in the magnets was carried out and the results are presented in the Table 4. These compositions are comparable with those previously reported. Based on the characterization results using Rietveld refinement, boron concentration was determined to be below 1 wt %. Since the accuracy of Rietveld refinement technique at such low concentrations is low, the extraction efficiency of B is not reported in this work. XRD analysis indicated that the magnet mainly consists of tetragonal $Nd_2Fe_{14}B$ with a small amount of neodymium trihydroxide ($Nd(OH)_3$) that is the product of the oxidation of Nd-rich regions upon contact with air after crushing (See FIG. 10 (b)). The surface morphology and elemental mapping of the magnet material was characterized using scanning electron microscopy (See FIG. 10 (c)). Backscattered secondary electron (BSE) image and energy dispersive spectroscopy (EDS) elemental mapping of a magnet particle cross-section are presented in FIG. 10 (d) to (i), which indicate that the Fe-rich phase forms into discrete granules with Nd- and Pr-rich phases in the inter-granular space. The lighter grey region on the BSE image (FIG. 10 (d)) corresponds to an oxygen-rich region that is likely the $Nd(OH)_3$ phase observed in the XRD spectrum. As can be seen in the SEM image in FIG. 10 (c), the magnet is made of irregularly-shaped bulk particles covered with smaller particles 1 μm in size on the surface. The bulk particle corresponds to the Fe-rich granules observed in the EDS elemental mapping of the particle cross-section and the small particles on the surface correspond to the Nd-rich intergranular phase that is liberated at the surface during the grinding process. These characterization results suggest that a portion of the REE content in the magnet is readily accessible for extraction as the surface-bound Nd-rich particles, whereas the REE contained in the Fe-rich phase would require degradation of these granules for extraction.

TABLE 4

Typical Compositions of individual phases of the NdFeB magnets. The compositions of representative regions of the NdFeB magnet were quantified using SEM-EDS. The BSE of the magnet, with the scanned regions, is presented below.

| Phase | Fe | Nd | Pr | O | Ce |
|---|---|---|---|---|---|
| $Nd_2Fe_{14}B$ Phase (A) | 71.21 wt % 86.40 mol % | 22.41 wt % 10.53 mol% | 5.86 wt % 2.82 mol % | — | 0.52 wt % 0.25 mol % |
| Nd-Rich Phase (B) | 11.93 wt % 23.89 mol % | 60.64 wt % 47.02 mol % | 26.26 wt % 20.84 mol % | 1.18 wt % 8.26 mol % | |
| $Nd(OH)_3$ Phase (C) | 8.86 wt % 9.49 mol% | 60.46 wt % 25.08 mol% | 14.87 wt % 6.31 mol % | 15.81 wt % 59.11 mol % | — |

Extraction Results. In this study, the relative effect of each operating parameter was assessed in a saturated fractional factorial design, including three replicate centre points. The resolution of this design was then increased from III to IV with a mirror-image foldover test, allowing for unaliased estimation of the primary test factors. The accuracy of the empirical model constructed from these tests was verified by a series of validation tests, which allow an independent comparison of the experimental extraction results and the model-predicted results. The experimental design matrix and the extraction results for each test are presented in Table 5.

TABLE 5

Overview of Experimental Design Matrix with Corresponding
Processing Parameters and Extraction Efficiencies for Fe, Nd, Dy, and Pr.
The saturated and mirror-image foldover results were used to construct
empirical extraction models, which were verified with the validation tests.
The test runs are presented in standard order but were performed in a
randomized order. (S:CA = Solid:Chelating agent ratio).

| Run Number (standard order) | Temperature $X_1$ (° C.) | Pressure $X_2$ (MPa) | Time $X_3$ (h) | S:CA $X_4$ (g/mL) | Agitation $X_5$ (rpm) | $HNO_3$ $X_6$ (M) | MeOH $X_7$ (wt %) | Extraction Efficiency (%) Fe, Nd, Dy, Pr |
|---|---|---|---|---|---|---|---|---|
| Saturated | | | | | | | | |
| 1 | 35 | 20.7 | 1.0 | 0.10 | 1500 | 15.7 | 0 | 48.2, 82.1, 86.8, 79.0 |
| 2 | 55 | 20.7 | 1.0 | 0.20 | 750 | 15.7 | 2 | 60.1, 80.6, 85.8, 79.7 |
| 3 | 35 | 31.0 | 1.0 | 0.20 | 1500 | 10.4 | 2 | 50.9, 70.6, 76.0, 68.4 |
| 4 | 55 | 31.0 | 1.0 | 0.10 | 750 | 10.4 | 0 | 60.3, 76.4, 79.6, 75.7 |
| 5 | 35 | 20.7 | 2.0 | 0.10 | 750 | 10.4 | 2 | 61.8, 77.9, 81.5, 77.7 |
| 6 | 55 | 20.7 | 2.0 | 0.20 | 1500 | 10.4 | 0 | 50.3, 67.8, 74.6, 66.9 |
| 7 | 35 | 31.0 | 2.0 | 0.20 | 750 | 15.7 | 0 | 62.1, 76.5, 78.3, 73.7 |
| 8 | 55 | 31.0 | 2.0 | 0.10 | 1500 | 15.7 | 2 | 48.3, 83.8, 88.7, 81.3 |
| 9 | 45 | 25.8 | 1.5 | 0.15 | 1125 | 13.0 | 1 | 51.5, 82.8, 85.8, 80.7 |
| 10 | 45 | 25.8 | 1.5 | 0.15 | 1125 | 13.0 | 1 | 52.9, 76.2, 81.3, 75.7 |
| 11 | 45 | 25.8 | 1.5 | 0.15 | 1125 | 13.0 | 1 | 52.9, 76.5, 82.4, 75.7 |
| Mirror-Image foldover | | | | | | | | |
| 12 | 55 | 31.0 | 2.0 | 0.20 | 750 | 10.4 | 2 | 53.3, 69.9, 74.9, 70.7 |
| 13 | 35 | 31.0 | 2.0 | 0.10 | 1500 | 10.4 | 0 | 53.3, 75.7, 78.8, 77.1 |
| 14 | 55 | 20.7 | 2.0 | 0.10 | 750 | 15.7 | 0 | 63.6, 85.0, 87.8, 86.6 |
| 15 | 35 | 20.7 | 2.0 | 0.20 | 1500 | 15.7 | 2 | 38.5, 68.5, 74.8, 69.3 |
| 16 | 55 | 31.0 | 1.0 | 0.20 | 1500 | 15.7 | 0 | 50.4, 74.1, 78.9, 75.8 |
| 17 | 35 | 31.0 | 1.0 | 0.10 | 750 | 15.7 | 2 | 49.7, 76.7, 81.2, 76.9 |
| 18 | 55 | 20.7 | 1.0 | 0.10 | 1500 | 10.4 | 2 | 31.1, 61.1, 56.6, 31.1, |
| 19 | 35 | 20.7 | 1.0 | 0.20 | 750 | 10.4 | 0 | 49.0, 63.2, 69.4, 65.4 |
| Validation Tests | | | | | | | | |
| Validation 1 | 55 | 31 | 2 | 0.2 | 750 | 15.7 | 0 | 64.4, 87.7, 83.6, 81.4 |
| Validation 2 | 55 | 31 | 1 | 0.1 | 750 | 10.4 | 1 | 55.1, 74.0, 55.4, 50.4 |
| Validation 3 | 55 | 31 | 1 | 0.1 | 750 | 10.4 | 2 | 50.7, 86.6, 88.1, 83.9 |
| Validation 4 | 55 | 20.7 | 1 | 0.1 | 1500 | 15.7 | 2 | 67.1, 93.6, 94.3, 86.9 |
| Validation 5 | 55 | 20.7 | 1 | 0.1 | 1500 | 15.7 | 2 | 57.4, 94.8, 100.0, 94.2 |

Figure 11:
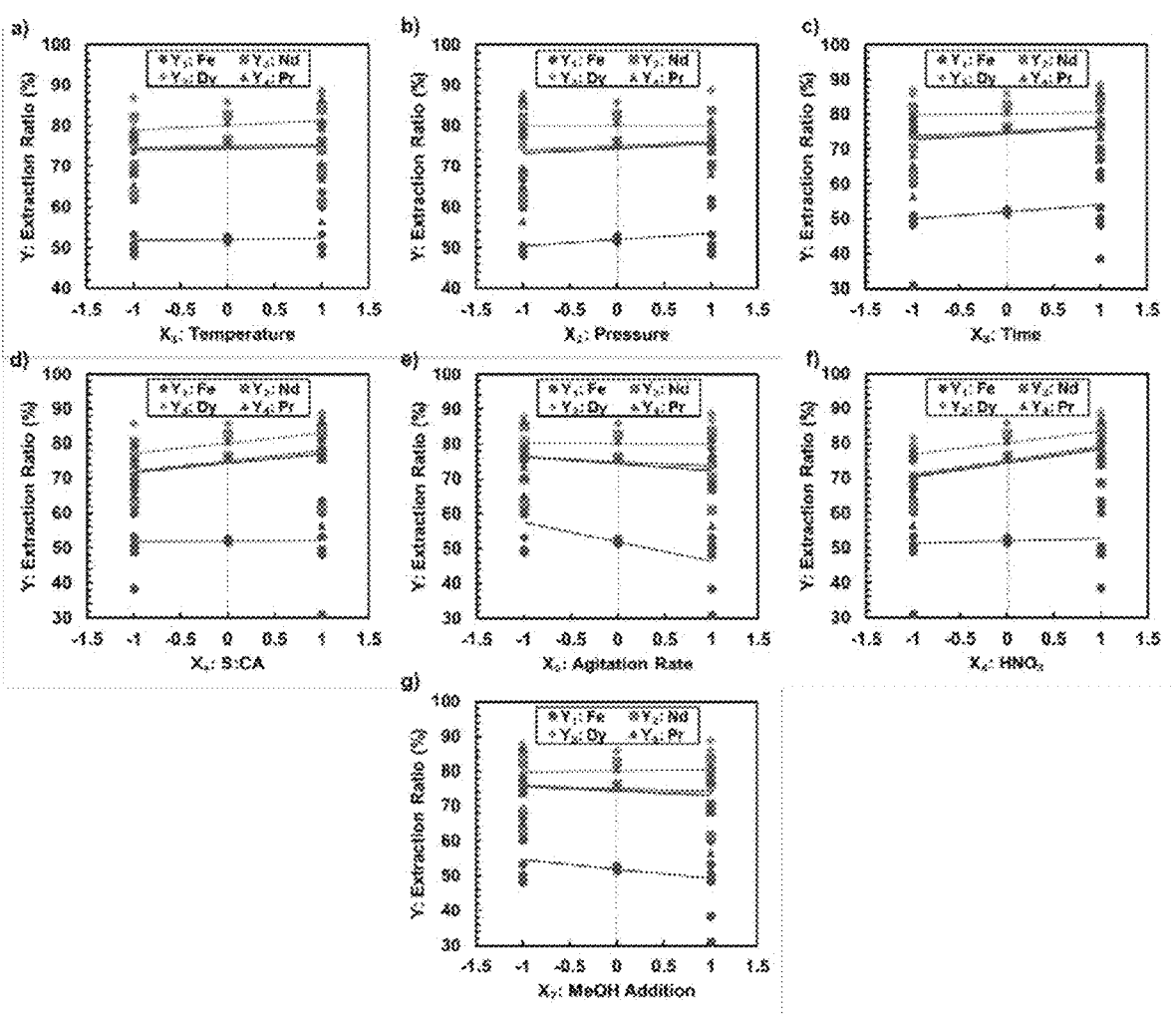
FIG. 11: Visual plots of the coded factor effects for each of the primary test parameters. Each line represents the linear fit of the extraction data for that experimental factor.

Visual plots of the factor effect for each primary test parameter is presented in FIG. 11. It was shown that Fe extraction (53.5 (+8) %) was significantly lower (t-test, p<0.001) than that of REEs (77.9 (+9) % on average). Among all operating parameters, increasing chelating agent ($X_4$) and the concentration of $HNO_3$ in the chelating agent ($X_6$) had the largest positive effect on REE extraction. Increasing agitation rate ($X_5$) appeared to have a strong negative effect on Fe extraction. The experimental results were used to build empirical extraction models to enable a quantitative comparison of relative effect of each tested operating parameter. In addition to providing an estimate of the between-run variance, the centre-point runs allowed a qualitative assessment of the quadratic effects of tested parameters.

Figure 12:
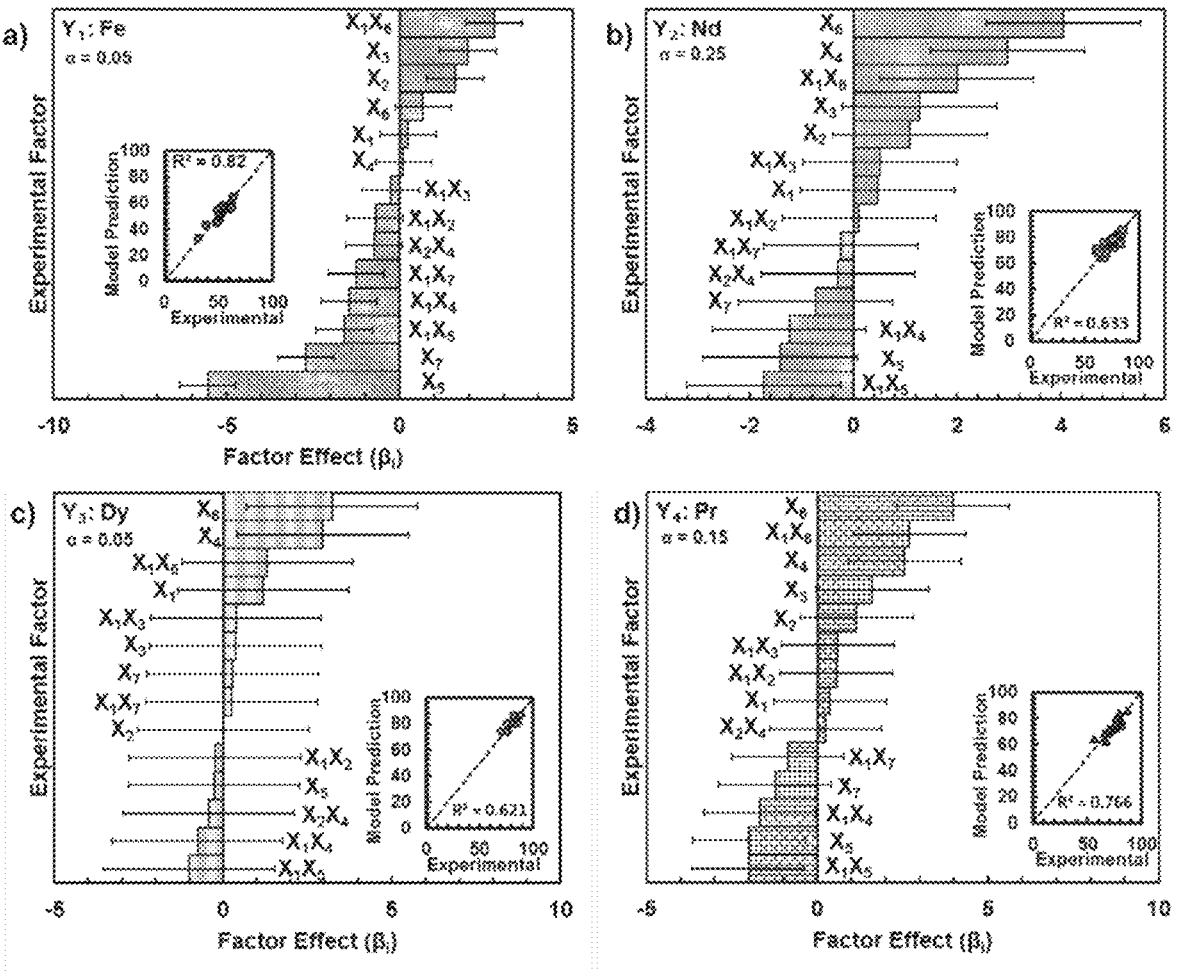
FIG. 12: Ordered charts of factor effect coefficients for the empirical extraction models. The error bars represent the (1-a) confidence interval for each of the factors (n=3, t-distribution). The inset panels indicate the correlation between the empirical models and the experimental data, and the coefficient of determination for the models. Each panel represents a different analyte and its associated extraction model: (a) Iron; (b) Neodymium; (c) Dysprosium; (d) Praseodymium.

Empirical extraction modelling. The relative effect of each primary test parameter and the aliased second-order interactions were estimated by constructing empirical extraction models by multiple Linear Least Squares Regression (mLLSR). These models do not give mechanistic insight into the extraction process, but they demonstrate how system responds to changes in each parameter. Ordered charts of model parameters alongside the model accuracy are presented in FIG. 12. The error bars represent the (1-a) confidence interval for the estimated model parameter coefficients. Factors with non-zero error bars have a statistically significant effect. As can be seen in FIG. 12, the three REEs demonstrated similar extraction trends, while Fe followed a different trend, suggesting that Fe and REEs follow a different extraction mechanism.

For all three REEs, factors with significant positive impact on extraction were "$HNO_3$ concentration in the chelating agent ($X_6$)", "(CA:S) ratio ($X_4$)", and the sum of three second-order interactions: "temperature×$HNO_3$ concentration ($X_1X_6$)", "pressure×agitation Rate ($X_2X_5$)", and "time×(CA:S) ratio ($X_3X_4$)".

Higher $HNO_3$ concentration enhances extraction because there are more acid molecules to attack the magnet particles; thus, liberating more REEs from the solid matrix, and making more $NO_3$-counter-ions available to form sc-$CO_2$-soluble REE-$NO_3$-TBP complexes. Similarly, at higher chelating agent content, more TBP molecules and $NO_3$-ions are available to capture liberated metal ions. With regards to second order interactions with significant positive impact on REEs extraction, there is a synergistic effect between the two parameters. For example, in the cases of $X_1X_6$, high acid concentration at elevated temperature increases reactivity, and in the case $X_3X_4$, higher chelating agent content in the system requires more residence time to effectively bond to the REE ions. This observation suggests that the matrix degradation by $HNO_3$ is the rate limiting step; thus, longer residence time is preferred for the added chelating agent to capture all REEs resulting from the matrix degradation by $HNO_3$ molecules. For Nd and Pr, the factors with largest significant negative impact on extraction were the aliased second order interactions of "temperature×agitation rate ($X_1X_5$)", "pressure×$HNO_3$ concentration ($X_2X_6$)", and "(CA:S) ratio×methanol addition ($X_4X_7$)". These factor pairs had an antagonistic effect, meaning that when both factors were set at their high settings, extraction was partially attenuated. In the case of $X_4X_7$, simultaneous increase in the amount of chelating agent and methanol could overload the system beyond the solvation power of sc-$CO_2$, thus decreasing the extraction efficiency. In the case of $X_1X_5$, increasing temperature has previously been shown to slightly enhance extraction in systems without mechanical agitation; however, the elevated temperature could destabilise the structure of REE-TBP-$NO_3$ reverse micelles, increasing their susceptibility to be disrupted by mechanical forces; thus, enhancing the negative effect of increasing the agitation rate. This negative effect of increasing agitation rate could be attributed to the unfavourable effect of shear environment on the solvation of REE-TBP-$NO_3$ reverse micelles by sc-$CO_2$. As was mentioned, Fe showed a fundamentally different extraction behaviour, with "$HNO_3$ concentration in the chelating agent ($X_6$)" and "(CA:S) ratio ($X_4$)", the two parameters with the largest significant positive effect on REE extraction, having no significant effect, while several parameters with no significant effect on REE extraction were shown to decrease Fe extraction. Thus, the operating parameters can be tuned to selectively enhance REE extraction while decreasing Fe extraction. Residence time ($X_3$) and pressure ($X_2$) had the most significant positive single-parameter effects on Fe extraction efficiency. Increasing residence time allows for longer degradation of the magnet particles, thus increasing Fe extraction, while at higher pressures, the density of sc-$CO_2$ is higher, thus it has a higher solvation power for Fe. These results suggest that while Fe extraction is controlled by the parameters that increase the magnet particle solubility in sc-$CO_2$, the extraction of REEs is controlled by the degree of complexation of these ions with the TBP-$HNO_3$ adducts. Because the overall Fe extraction was significantly (a=0.05) lower than that of the REEs, it can be concluded that the Fe-CA complex is less soluble than the REE-CA complex, thus it is more susceptible to break in high shear environments, i.e., at higher agitation rate ($X_5$). Regarding the presence of methanol as cosolvent, this factor had a negative impact on Fe extraction. Methanol addition is expected to increase metal solubility in sc-$CO_2$ by increasing the solvent polarity and by promoting rapid desorption, preventing re-adsorption, and covering the matrix active sites, or by altering the matrix. A hypothesis to explain this observation is that there is a difference in the Fe oxidation state in the alcohol-containing environment. This finding suggests that methanol can be used as a tuning agent to selectively enhance REE extraction while reducing Fe co-extraction, thus reducing downstream separation/purification costs. The series of fractional factorial experiments and subsequent empirical model construction enabled evaluating the relative effect of the tested operating parameters on the system response and allowing for the prediction of extraction efficiency beyond the configurations tested experimentally. For instance, the conditions that resulted in maximum REE extraction (weighted by raw magnet composition and pure oxide value, is given by Settings 1 in Table 6, result in a predicted extraction efficiency of 86% for the three REEs with a selectivity of 0.60 $Kg_{REE}/kg_{Fe}$. Alternatively, the process parameters settings could be adjusted as Settings 2 in Table 6 to maximize the selectivity of REE extraction over Fe extraction at 0.89 $Kg_{REE}/kg_{Fe}$ with a predicted extraction efficiency of 82% for the REEs. The Settings 2 results in considerably higher REE product at more economically favourable conditions, such as low process pressure and short residence time.

TABLE 6

Overview of optimized parameter settings and predicted extraction
efficiencies, value recovery, selectivity, and value extracted in USD/kg$_{magnet}$
(price calculation details are provided in the Supporting Information).
(S:CA = Solid:Chelating agent ratio).

| Temperature X$_1$ (°C.) | Pressure X$_2$ (MPa) | Residence time X$_3$ (h) | S:CA X$_4$ (g/mL) | Agitation X$_5$ (rpm) | HNO$_3$ X$_6$ (M) | MeOH X$_7$ (wt %) | Predicted extraction efficiency for Fe, Nd, Dy, and Pr (%) | Average REE Recovery (%) | Predicted Selectivity (kg$_{REE}$/kg$_{Fe}$) | Predicted REE value extracted (USD/ kg$_{magnet}$) |
|---|---|---|---|---|---|---|---|---|---|---|
| | | | | Settings 1: Max REE value recovery | | | | | | |
| 55 | 25.8* | 1.5* | 0.1 | 750 | 15.7 | 1* | 60.4, 85.8, 86.3, 85.9 | 85.8% | 0.60 | $23.94 |
| | | | | Settings 2: Max REE selectivity | | | | | | |
| 55 | 20.7 | 1 | 0.1 | 1500 | 15.7 | 2 | 38.6, 82.3, 86.3, 77.9 | 81.5% | 0.89 | $22.75 |
| | | Experimental Results: replicate 1 | | | | | 67.1, 93.6, 94.3, 86.9 | 92.4% | 0.58 | $25.78 |
| | | Experimental Results: replicate 2 | | | | | 57.4, 94.8, 100, 94.2 | 94.7% | 0.70 | $26.44 |

*no significant effect on value recovery

On the basis of these results, the optimal operating conditions were selected as Settings 2. Two replicate runs were performed under these conditions to assess the predictability of the model (Table 6). These runs showed the highest REE extraction efficiency (92-95%) among all cases studied, even surpassing the model's prediction; however, the REE:Fe selectivity was lower than model predictions (0.58-0.70 instead of 0.89 Kg$_{REE}$/kg$_{Fe}$). The deviation from the model can be explained by two phenomena. Because the empirical model has a resolution IV, the second order factor interaction parameters are confounded with each other, meaning that there might be interactions in the system that are not independently represented within the model that may affect the response, and/or random error and lack of model fit, since different components of the model are estimated at different confidence levels. Overall, the optimization of the operating parameters resulted a set of process conditions that yields greater than 90% overall REE extraction, which corresponds to approximately $26/kg$_{magnet}$.

Figure 13:
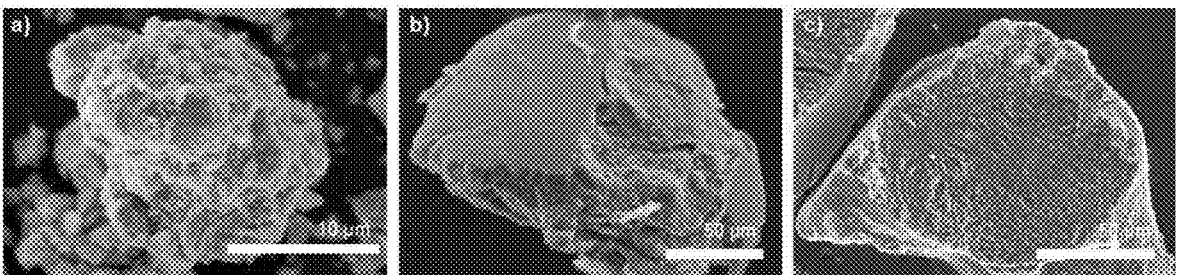
FIG. 13: (a) SEM image of the unprocessed magnet sample; (b) SEM image of the magnet sample after extraction in the experimental run with the lowest observed overall REE extraction efficiency (64.5%—Run 18); (c) SEM image of the magnet sample after extraction in the experimental run with the highest observed overall REE extraction efficiency (96.3%—Validation Run 5).

Effect of surface microstructure. FIG. 13 (*a-c*) presents SEM micrographs of the magnet particles before and after SCFE. As shown, the distinctive Fe-rich granules covered in Nd-rich particles observed on magnet particles before SCFE (FIG. 13 (*a*)) are not observed on post-SCFE samples. The lack of apparent surface Nd-rich particles is due to the preferential dissolution of the Nd-rich and B-rich intergranular phases over the Fe-rich granules because the former phases have poor corrosion resistance because of the high reactivity of Nd. An increase in the particle size was observed after SCFE, likely because the smaller Fe-rich particles were more readily dissolved, leaving behind larger particles. The run showing the lowest overall REE extraction (Run 18, FIG. 13 (*b*)) and the one with the highest overall REE extraction (Validation Run 5, FIG. 13 (*c*)) show different morphologies. Run 18, in which only 60% of the total REEs was extracted, left residue particles with some flat regions and some rougher surfaces, indicating the regions that were attacked by the acid and chelating agent. Validation Run 5, in which 95% of the total REEs were extracted, also had some flat regions and some with more evident hierarchical roughness and porosity, indicating a more severe attack by the acid and chelating agent. It should be mentioned that the amount of remaining solid after SCFE was significantly lower in Validation Run 5 in which higher acid concentration was utilized.

Figure 14:
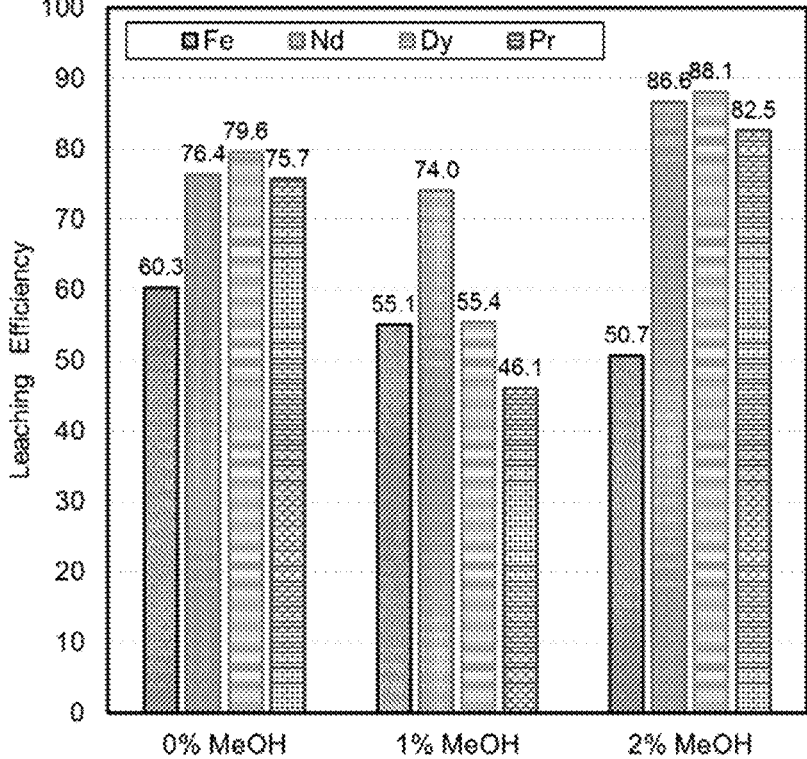
FIG. 14: Graph showing comparison of the extraction performance with and without the addition of methanol (MeOH). All other parameters were held constant.

Effect of Methanol on extraction. The results of additional validation runs on the effect of methanol addition on Fe and REE extraction are presented in FIG. 14. These results confirm the empirical model results that the addition of methanol has a negative effect on Fe extraction and a positive effect on REE extraction. Fell shows a lower extraction efficiency compared with Fe$^{III}$. When solid Fe is exposed to dilute HNO$_3$, it oxidizes to Fe$^{III}$ in water environment and to Fell in alcohol environment. Thus, in a methanol containing environment, some of the Fe in the magnet is converted to the Fell state, resulting in the observed decrease in Fe extraction.

Figure 15:
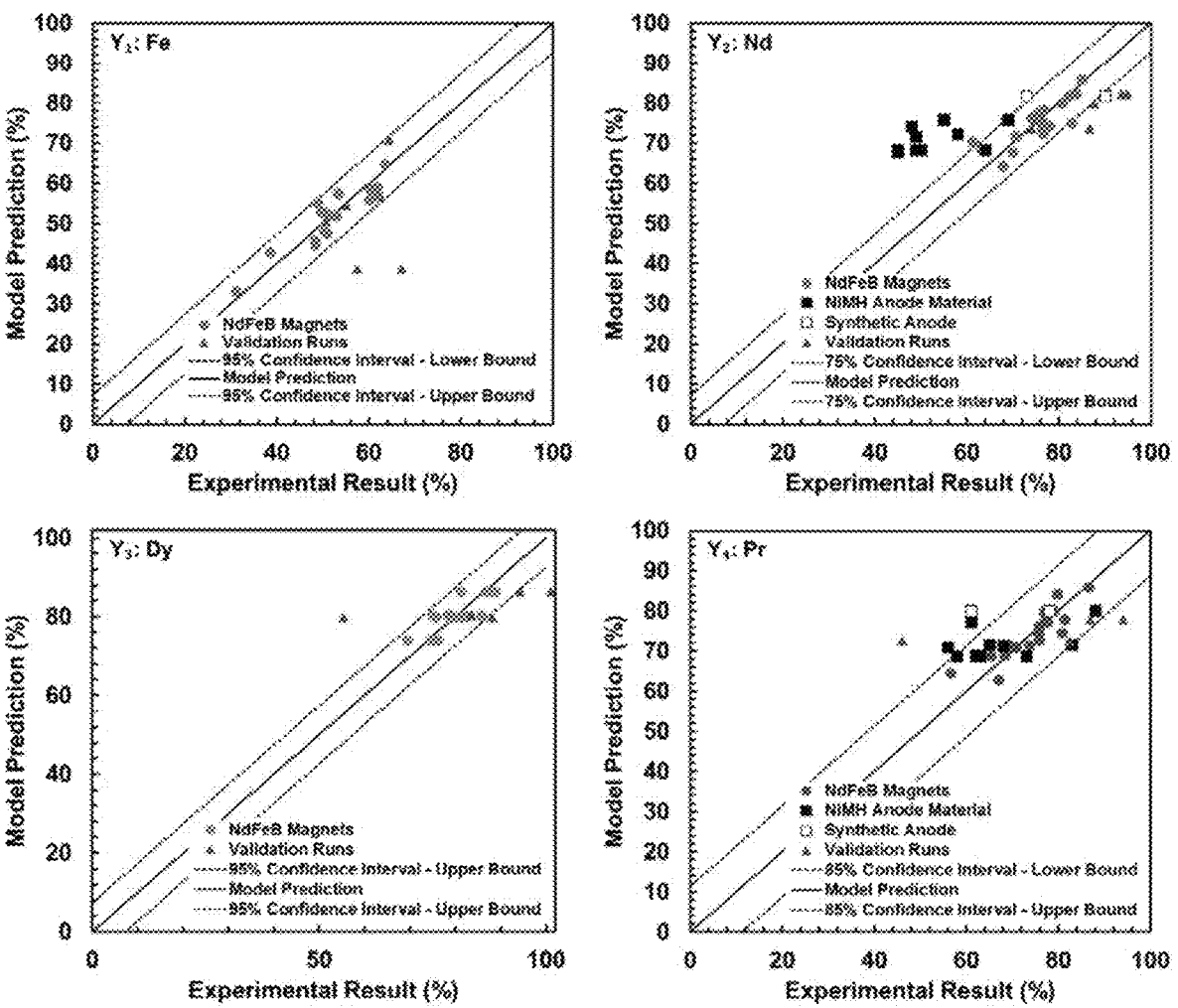
FIG. 15: Empirical model validation with additional run results for NdFeB magnets, and comparison with NiMH extraction results. The validation run experimental results are plotted against the corresponding model predictions.

Validation of model and comparison with NiMH results. To assess the predictability of the model, additional validation tests were conducted, which do not correspond to tests prescribed by the fractional factorial design. Furthermore, because the selected test levels were equivalent to the levels used in the previous study on NIMH batteries, model predictions for Nd and Pr in the NiMH study were also calculated. The results of empirical model correlation of the validation runs and those of NiMH battery runs are presented in FIG. 15. For the most part, the validation runs fall within or close to the confidence intervals. The average deviation of the experimental results from the model was: Fe: 11%, Nd: 9%, Dy: 10%, and Pr: 13%, which is acceptable given that this model has a resolution of IV, and the confidence for the REE extractions are 75-95%. The Nd and Pr extraction from NiMH battery generally fell outside of the confidence intervals for the models, and the residuals appeared to follow an ordered downwards trend, indicating a difference in the extraction mechanism. Furthermore, in most cases, the observed extraction from the NiMH battery was lower than what would be expected for the NdFeb magnet under the same operating conditions. These results are consistent with the fact that the main matrix material to be broken by HNO$_3$ is Ni for the battery and Fe for the magnet, and these two elements have different corrosion properties, as Ni is more resistant to attack by HNO$_3$.

Exploration of mechanisms for the SCFE process. To uncover the mechanism of the REE and Fe extraction from NdFeB magnet using sc-$CO_2$, experiments were conducted on synthetic mixtures containing $Nd_2O_3$, $Fe_2O_3$, and FeO. It is known that the most common oxidation number for most REEs, including Nd, is III and that Fe exists as both FeII and Fe$^{III}$. During the extraction process, $HNO_3$ attacks ferromagnetic $Nd_2Fe_{14}B$ and oxidizes Nd to $Nd^{3+}$ and Fe to $Fe^{2+}$ and $Fe^{3+}$, which then react with TBP, forming metal complexes. To determine the effect of charge and elemental nature on the complexation process and hence the extraction, the SCFE of two synthetic oxide mixtures was studied, i.e., 1 $Fe^{2+}$: 1 $Nd^{3+}$ (i.e., 50 wt % FeO+50 wt % $Nd_2O_3$) and 1 $Fe^{3+}$: 1 $Nd^{3+}$ (i.e., $Fe_2O_3$ (50 wt %)+$Nd_2O_3$ (50 wt %)) under the test conditions of Run 16 in Table 1.

Figure 16:
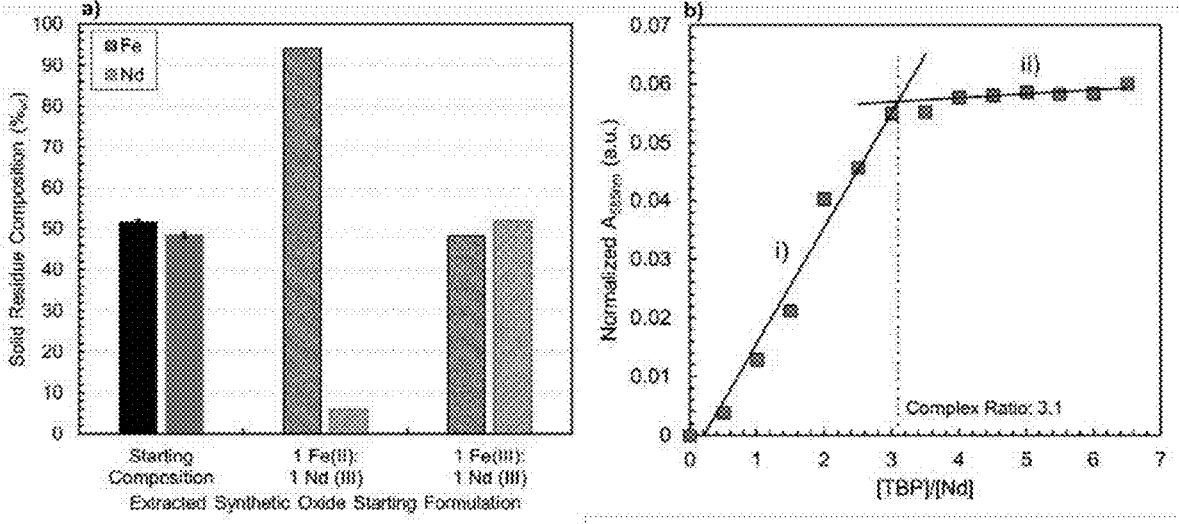
FIG. 16: Graphs showing synthetic oxide extraction and complexing trials: (a) Compositions of solid extraction residues remaining after sc-$CO_2$ extraction from synthetic mixtures of FeO, $Fe_2O_3$, and $Nd_2O_3$. The solid bars represent the starting composition of the mixed unextracted oxides and the patterned bars represent the compositions of the extraction residues. The error bars represent the sample standard deviation for the starting composition (n=3). (b) UV-Vis complexation investigation. The absorbance at 585 nm was measured for mixtures of $Nd(NO_3)_3$ and TBP in hexanes. The Nd-TBP complex stoichiometric ratio was determined as the intersection of the linear response region (i) and the plateau region (ii) linear fits.

FIG. 16 (a) presents the composition of Fe and Nd in the pre- and post-SCFE solid samples. As can be seen, in the oxide mixture containing 1 $Fe^{2+}$: 1 $Nd^{3+}$, the post-SCFE solid is primarily composed of Fe, with almost no Nd present, indicating that the extraction process preferentially selects $Nd^{3+}$ over $Fe^{2+}$. Moreover, in the oxide mixture containing 1 $Fe^{3+}$: 1 $Nd^{3+}$, the post-SCFE sample contained similar amounts of Nd and Fe, indicating that there is no preferential difference between the complexation of $Fe^{3+}$ and $Nd^{3+}$, thus their extraction is similar. On the basis of these results, the main driver for the complexation reaction between TBP chelating agent and the metal ion is the ion charge (+3 preferred over +2) because usually higher charge is correlated with higher coordination number, which in turn results in a higher solubility in sc-$CO_2$. In the other study on SCFE of REEs from NiMH battery, a mechanism for the extraction process was proposed, in which bidentate nitrate anions from the TBP-$HNO_3$ extractant chelate to the $REE^{3+}$ cation, forming neutral REE nitrates REE $(NO_3)_3$. Because of hydrophobic interactions between aliphatic tails and dipole-dipole interactions between phosphate groups of TBP, reverse micelles are formed. Therefore, when TBP chelating agent is in contact with hydrophilic solutes like REE salts, they are attached to the polar cores. In the case of Nd, the cation is centered in a coordinate environment comprised of three bidentate nitrate anions and n TBP molecules (Reaction 1 and 4). For determining n in the case of Nd, synthetic solutions were made, containing $Nd(NO_3)_3$ with varying composition of TBP from 0 to 6.5 in hexane, a model solution for sc-$CO_2$, and these samples were characterized using UV-Visible spectroscopy. As shown in FIG. 16 (b), the stoichiometric ratio at which $Nd(NO_3)_3$ complexes with TBP is 1 Nd: 3 TBP, indicated by the point at which absorbance peak reaches a plateau. On the basis of these results, n is determined to be 3, which assumes all lanthanides have a coordination number of 9, suggesting that in the case of $Nd^{3+}$ chelated with three bidentate $NO^{3-}$, three TBP molecules are required to complete the coordination sphere. On the basis of these observations, we propose the complex has a formula of $Nd(NO_3)_3$ $(TBP)_3$.

Because $Fe^{3+}$ has a similar charge to $Nd^{3+}$ and during the SCFE process of synthetic mixture of 1 $Nd^{3+}$: 1 $Fe^{3+}$, the composition of Nd and Fe in the post-SCFE sample was the same, it was hypothesized that $Fe^{3+}$ also forms a complex with three bidentate nitrate anions and three TBP molecules, i.e., $Fe(NO_3)_3$ $(TBP)_3$ (Eq. 2 and 5). However, in the case of $Fe^{2+}$, it can only bind with two bidentate nitrate anions and n TBP molecules, and if one considers one TPB per bidentate anion, n is expected to be 2 (Reactions 3 and 6). It is known that complexes with a higher number of TBP molecules have higher solubility is sc-$CO_2$ due to higher number of aliphatic tails. Thus, $Fe(NO_3)_2$ $(TBP)_2$ is expected to have a lower solubility in sc-$CO_2$, which is consistent with the very low extraction efficiency of Fe during the SCFE process of synthetic mixture of 1 $Nd^{3+}$: 1 $Fe^{2+}$.

$$Nd + 3\ HNO_3 \rightarrow Nd^{3+} + 3\ NO^{3-} + 1.5\ H_2 \tag{1}$$

$$Fe + 3\ HNO_3 \rightarrow Fe^{3+} + 3\ NO^{3-} + 1.5\ H_2 \tag{2}$$

$$Fe + 2\ HNO_3 \rightarrow Fe^{2+} + 2\ NO^{3-} + H_2 \tag{3}$$

$$Nd^{3+} + 3\ NO^{3-} + 3\ TBP \rightarrow Nd(NO_3)_3(TBP)_3 \tag{4}$$

$$Fe^{3+} + 3\ NO^{3-} + 3\ TBP \rightarrow Fe(NO_3)_3(TBP)_3 \tag{5}$$

$$Fe^{2+} + 2\ NO^{3-} + 2\ TBP \rightarrow Fe(NO_3)_2(TBP)_2 \tag{6}$$

As demonstrated by acid-base and Karl Fisher titration, the stoichiometry of the TBP-$HNO_3$ chelating agent is complex, which is consistent with the presence of a mixture of several different distinct adduct complexes formed by strong hydrogen bonding at the P=O site of TBP. This includes TBP-$HNO_3$, TBP-$2HNO_3$, TBP-$H_2O$-$HNO_3$, and/or complicated xTBP-y$H_2O$-z$HNO_3$ clusters all present in different proportions, determined by the acid concentration utilized during chelating agent preparation. The structure of some of these adduct complexes are presented in FIG. 17.

Figure 18:
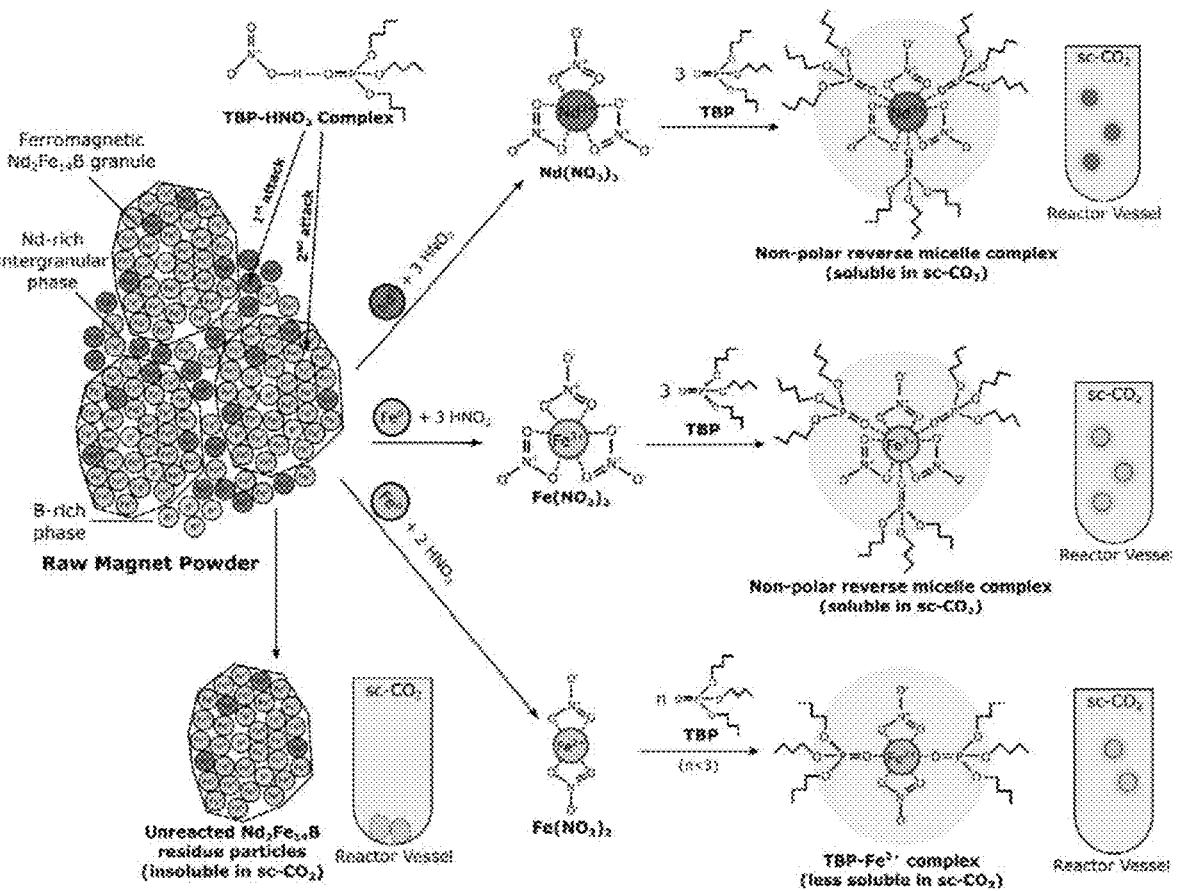
FIG. 18: Illustration of the sc-$CO_2$ extraction model. This schematic diagram illustrates the proposed NdFeB magnet extraction pathway. For simplicity, Nd is the only REE represented, but Pr and Dy can be considered to behave similarly to Nd.

On the basis of the results, the following molecular mechanism was proposed for the extraction of Nd(similar for other REEs) and Fe from NdFeB magnet material using TBP-$HNO_3$ as an extracting agent in sc-$CO_2$ (See FIG. 18). First, $HNO_3$ reacts with Nd and Fe in the $Nd_2Fe_{14}B$ particle forming $Nd^{3+}$, $Fe^{2+}$, and $Fe^{3+}$ (Reactions (1-3)). Then metal cations and nitrate anions react in a ratio that results in charge neutrality and complex to n TBP molecules (Reactions (4-6)). Upon complexation and reverse micelles formation, these micelles bond to one another via hydrophobic interactions of aliphatic functionalities and above a certain interaction limit, micellar condensation happens as the last step in which micellar chains are formed as a result of bonding between individual aliphatic shells, forming highly ordered macroscopic assemblies.

Conclusions from Preferred Embodiment 2

An environmentally friendly process utilizing sc-$CO_2$ as the solvent along with TBP-$HNO_3$ chelating agent and methanol as co-solvent was developed to extract Nd, Dy, and Pr from end-of-life NdFeB magnet. This process utilizes minimum amount of organic solvents; thus, it generates minimum amount of waste. A fractional factorial experimental design methodology was utilized to investigate the effect of seven operating parameters, resulting in 94% Nd, 94-100% Dy, and 87-94% Pr extraction with only 57-67% Fe co-extraction. An economic analysis of a full-scale industrialized iteration of this process was performed. The results indicated the process can be economically viable with a break-even processing rate of 30 kg of magnet per hour, given a final product REE purity of >99 wt % and <0.1 wt % foreign metal contamination, achieved by downstream separations, which will be developed in future work. The process was modelled as a batch process—operated continuously by employing twin extraction vessels in parallel—where one reactor is loaded while the other is operating. The largest cost drivers were capital investment for high pressure equipment and raw materials costs, particularly TBP—a TBP recycling rate of 90% was assumed (10% TBP loss was selected as a preliminary conservative estimate of the amount of the organic-soluble TBP phase, which would be lost during the stripping phase of this process). The main utility costs were the heating cost to bring $CO_2$ to the supercritical state, and the compression cost to liquefy gaseous $CO_2$ remaining after the depressurization stage to allow for storage.

With respect to Preferred Embodiment 2, the following conditions may preferably apply:

the temperature in the reactor chamber is adjusted to a range of about 35 to 55° C.;

the pressure in the reactor chamber is adjusted to a range of about 20.7 to 31 MPa, more preferably about 20.7 to 25.8 MPa;

the source comprising the target metal, the chelating agent and the solvent are allowed to react in the reactor chamber for a residence time in a range of about 1 to 2 hours, more preferably about 1 to 1.5 hours;

the source-to-chelating agent ratio is in a range of about 0.1 to 0.2;

the source comprising the target metal, the chelating agent and the solvent are subjected to an agitation rate in a range of about 750 to 1500 rpm;

the chelating agent comprises $HNO_3$ in a concentration of about 10.4 to 15.7 M; and adding the methanol to the reactor chamber in an amount of about 0.01 to 2 mol %, more preferably about 1 to 2 mol %.

The following conditions may be more preferable:

the temperature in the reactor chamber is adjusted to about 55° C.;

the pressure in the reactor chamber is adjusted to about 20.7 MPa;

the residence time is about 1 hour;

the source-to-chelating agent ratio is about 0.1;

the agitation rate is about 1500 rpm;

the chelating agent comprises $HNO_3$ in a concentration of about
15.7 M; and adding the methanol to the reactor chamber in an amount of about
2 mol %.

Preferred Embodiment 3: Extraction of Rare Earth Elements from Phosphor

In a further preferred embodiment, the source is a phosphor and the target metal in one or more rare earth elements. Experimental Section for Preferred Embodiment 3

The feasibility of the supercritical fluid extraction of rare earth elements, strontium (Sr), and antimony (Sb) was assessed in a series of extraction trials. The feedstock for these trials was pre-separated fluorescent lightbulb (FL) luminescent material from a fluorescent lamp recycling facility.

Figure 19:
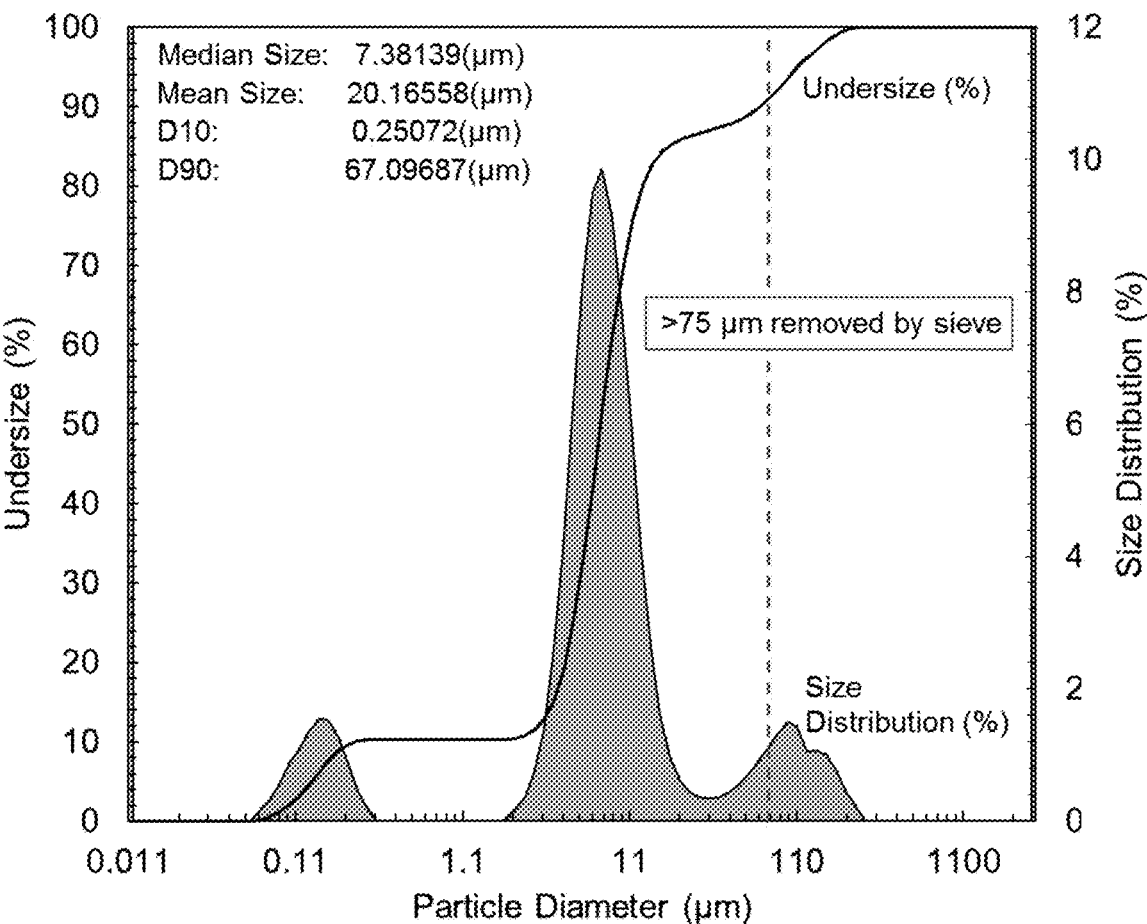
FIG. 19: Graph showing particle size analysis of the starting FL luminescent material.

Characterization of FL luminescent material. Prior to extraction trials, the physical and chemical characteristics of the starting luminescent material were characterized. The starting material was a powder corresponding to the inner coating of end-of-life FLs. The particle size distribution was determined by laser particle size analysis, shown in FIG. 19. A trimodal distribution was observed, corresponding to three different types of particles. Particles with a diameter larger than 75 µm were removed by sieving, as they correspond primarily to silica particles, which do not contain the target elements.

The chemical composition of the sieved luminescent material was determined by ICP-OES, following microwave-assisted digestion in concentrated aqua regia. FL luminescent material can be considered a high grade source of REEs (39.6 wt %), and a concentrated source of Sr (1.6 wt %) and Sb (0.1 wt %).

Figure 20:
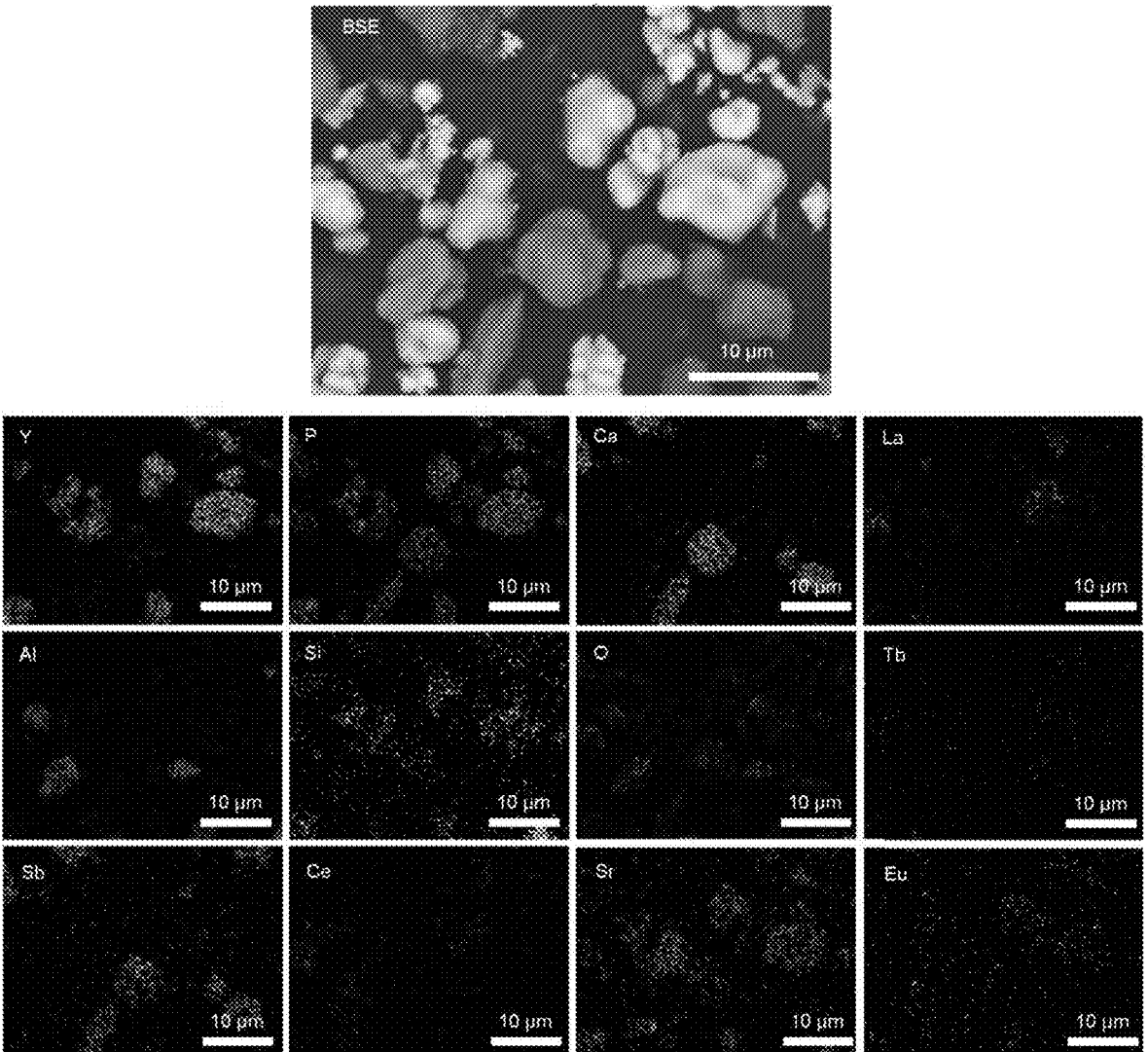
FIG. 20: SEM-BSE and SEM-EDS scans of the FL luminescent material.

The morphology and distribution of the various constituent elements in the luminescent material powder was determined by SEM-BSE and SEM-EDS, as shown in FIG. 20. Based on this characterization, the constituent materials appeared to form a variety of individual particles with uniform composition, rather than occurring as substitutions or regions within larger matrix particles. Yttrium appeared to co-localize with phosphorus and silicon; aluminum co-localized with oxygen; calcium co-localized with oxygen, phosphorus, and antimony; strontium appeared to be associated with silicon and phosphorus; and lanthanum and cerium appeared to co-localize.

TABLE 7

Elemental metal composition of sieved FL luminescent material. Concentrations were determined by ICP-OES, following microwave-assisted aqua regia digestion. The presented values correspond to the average over 5 trials (±standard deviation).

| Target materials | | Other Materials | |
|---|---|---|---|
| Element | Composition (wt %) | Element | Composition (wt %) |
| Yttrium (Y) | 28.0 (±0.3) | Calcium (Ca) | 10.2 (±0.7) |
| Lanthanum (La) | 4.7 (±0.3) | Aluminum (Al) | 2.0 (±0.2) |
| Cerium (Ce) | 3.7 (±0.4) | Barium (Ba) | 0.4 (±0.1) |
| Europium (Eu) | 1.9 (±0.1) | Magnesium (Mg) | 0.1 (±0.02) |
| Strontium (Sr) | 1.6 (±0.1) | | |
| Terbium (Tb) | 1.3 (±0.1) | | |
| Antimony (Sb) | 0.1 (±0.01) | | |

Extraction Results. Various extraction trials were performed under a variety of process conditions, as outlined in Table 8. The studied parameters for these trials were the extraction duration, reactor temperature, the solid to chelating agent ration, the solid to $CO_2$ ratio, the addition of methanol as a co-solvent, and the type of chelating agent used.

TABLE 8

Summary of FL luminescent material extraction trial parameters.
Table 8. Summary of FL luminescent material extraction trial parameters.

| Test ID | Extraction time | Agitation rate (rpm) | Temperature (° C.) | Pressure (MPa) | S:CA* | S:CO2** | Methanol addition (mol %) | Chelating Agent |
|---|---|---|---|---|---|---|---|---|
| FL-1 | 1 h | 750 | 50 | 31.0 | 2 g:5 ml | 2 g:100 ml | 0 | TBP-HNO3 |
| FL-2 | 1 h | 750 | 50 | 31.0 | 5 g:5 ml | 5 g:100 ml | 0 | TBP-HNO3 |
| FL-3 | 1 h | 750 | 50 | 31.0 | 2 g:5 ml | 2 g:100 ml | 0 | D2EHPA-HNO3 |
| FL-4 | 1 h | 750 | 50 | 31.0 | 10 g:10 ml | 10 g:100 ml | 0 | TBP-HNO3 |
| FL-5 | 2 h | 750 | 50 | 31.0 | 5 g:5 ml | 5 g:100 ml | 0 | TBP-HNO3 |
| FL-6 | 3 h | 750 | 60 | 31.0 | 5 g:5 ml | 5 g:100 ml | 0 | TBP-HNO3 |

TABLE 8-continued

Summary of FL luminescent material extraction trial parameters.
Table 8. Summary of FL luminescent material extraction trial parameters.

| Test ID | Extraction time | Agitation rate (rpm) | Temperature (° C.) | Pressure (MPa) | S:CA* | S:CO₂** | Methanol addition (mol %) | Chelating Agent |
|---|---|---|---|---|---|---|---|---|
| FL-7a | 3 h | 750 | 60 | 31.0 | 0.5 g:5 ml | 0.5 g:100 ml | 2 | TBP-HNO₃ |
| FL-7b | 3 h | 750 | 60 | 31.0 | 0.5 g:5 ml | 0.5 g:100 ml | 2 | TBP-HNO₃ |

*Solid to chelating agent ratio
**Solid to CO₂ ratio (g per total volume)

Figure 21:
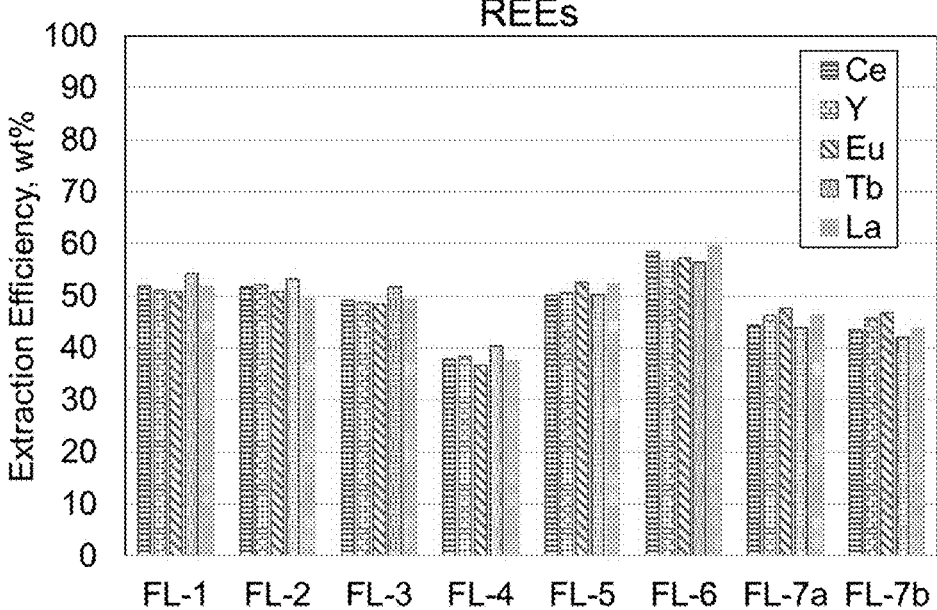
FIG. 21: Graph showing REE extraction results from FL luminescent material.

The extraction results for REEs are shown in FIG. 21. Overall, these results indicate that SCFE is a viable technique for REE extraction from FL luminescent material, achieving up to 60% extraction, prior to any systematic process optimization. The extraction of all studied REEs followed the same general trends, suggesting that they all extract following a similar mechanism.

Figure 22:
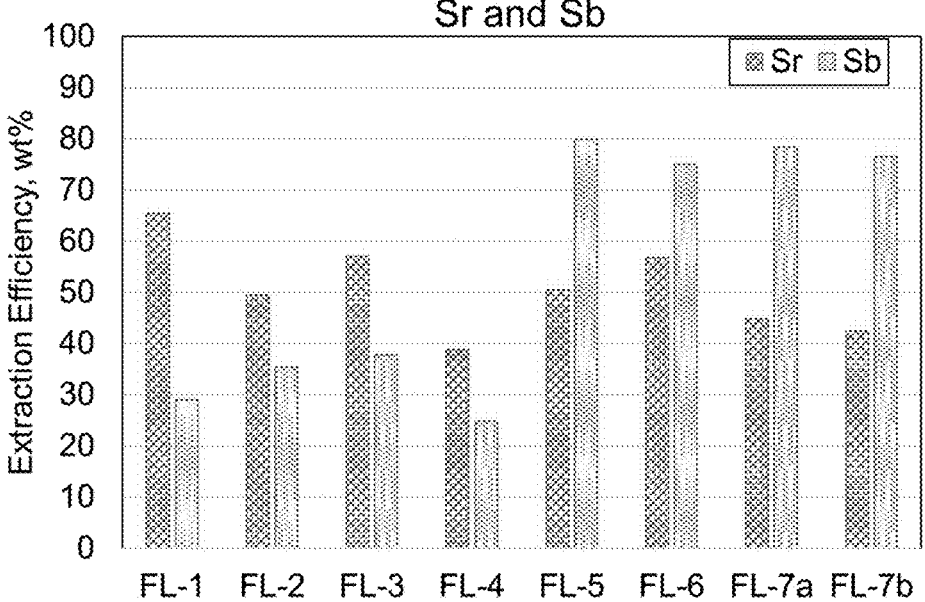
FIG. 22: Graph showing Sr and Sb extraction results from FL luminescent material.

The SCFE process also extracts Sb and Sr which are considered strategic materials as well. The extraction results for Sb and Sr are shown in FIG. 22. These results demonstrate that SCFE is also a viable technique to extract Sr and Sb from FL luminescent materials. In these trials, up to 65% extraction of Sr was achieved. Sr appeared to follow similar extraction trends to the REEs. Sb extraction was markedly higher for FL-5 to FL-7 than for the previous trials, suggesting that increasing the extraction time from 1 h to 2 h or higher is highly important for Sb extraction from this material.

In this preferred embodiment, the following conditions may be preferable:
the temperature in the reactor chamber is adjusted to a range of about 50 to 70° C., more preferably about 50 to 60° C.;
the pressure in the reactor chamber is adjusted to a range of about 20.7 to 45 MPa, more preferably about 31 MPa;
the source comprising the target metal, the chelating agent and the solvent are allowed to react in the reactor chamber for a residence time in a range of about 0.01 to 3 hours, more preferably about 1 to 3 hours;
the source-to-chelating agent ratio is in a range of about 0.05 to 1;
the source comprising the target metal, the chelating agent and the solvent are subjected to an agitation rate in a range of about 0.01 to 2500 rpm, more preferably about 750 rpm;
the chelating agent comprises HNO₃ in a concentration of about 15.7 to 21.4 M; and
adding the methanol to the reactor chamber in an amount of about 0.01 to 2 mol %.

The chelating agent may preferably be selected from the group consisting of TBP, DEHPA, HEHEHP, Bis(2,4,4-trimethylpentyl)phosphinic acid (Cyanex 272), Bis(2,4,4-trimethylpentyl)dithiophosphinic acid (Cyanex 301), di(2,4,4-trimethylpentyl) octyl phosphine oxide (Cyanex 925), Neodecanoic acid (Versatic 10) and 16,16-dimethylheptadecan-1-amine (Pimene JMT).

Preferred Embodiment 4: Extraction of Rare Earth Elements from Bauxite Residue

In yet another preferred embodiment, the source is bauxite residue and the target metal is one or more rare earth elements. This preferred embodiment may optionally include a pre-neutralization step.

In this preferred embodiment, the following conditions may be preferable:
the temperature in the reactor chamber is adjusted to a range of about 35 to 55° C.;
the pressure in the reactor chamber is adjusted to a range of about 20.7 to 45 MPa;
the source comprising the target metal, the chelating agent and the solvent are allowed to react in the reactor chamber for a residence time in a range of about 0.01 to 2.0 hours;
the source-to-chelating agent ratio is in a range of about 0.05 to 0.2;
the source comprising the target metal, the chelating agent and the solvent are subjected to an agitation rate in a range of about 1500 to 2500 rpm;
the chelating agent comprises HNO₃ in a concentration of about 15.7 to 21.4 M; and
adding the co-solvent to the reactor chamber in an amount of about 0.01 to 10 mol %.

The co-solvent may preferably be methanol or oxalic acid solution in water.

The chelating agent may preferably be selected from the group consisting of TBP, DEHPA, HEHEHP, Bis(2,4,4-trimethylpentyl)phosp hinic acid (Cyanex 272), Bis(2,4,4-trimethylpentyl)dithiophosphinic acid (Cyanex 301), di(2,4,4-trimethylpentyl) octyl phosphine oxide (Cyanex 925), Neodecanoic acid (Versatic 10) and 16,16-dimethylheptadecan-1-amine (Pimene JMT).

Preferably, the chelating agent comprises an acid selected from the group consisting of nitric acid, sulfuric acid, hydrochloric acid, phosphoric acid, hydrofluoric acid, citric acid, acetic acid and oxalic acid.

Preferred Embodiment 5: Extraction of Metal from a Lithium Ion Battery

In another preferred embodiment, the source is a lithium ion battery and the target metal is one or more of lithium, nickel, and cobalt. This preferred embodiment may optionally comprise a first extraction phase to extract organic components from the lithium ion battery and a second extraction phase, using the same or different reaction conditions, to extract the lithium, nickel and/or cobalt.

In this preferred embodiment, the following conditions may be preferable:
the temperature in the reactor chamber is adjusted to a range of about 35 to 60° C.;
the pressure in the reactor chamber is adjusted to a range of about 20 to 45 MPa;
the source comprising the target metal, the chelating agent and the solvent are allowed to react in the reactor chamber for a residence time in a range of about 0.01 to 3.0 hours;

the source-to-chelating agent ratio is in a range of about 0.01 to 2;

the source comprising the target metal, the chelating agent and the solvent are subjected to an agitation rate in a range of about 750 to 2500 rpm;

the chelating agent comprises $HNO_3$ in a concentration of about 0.01 to 21.4 M; and adding the co-solvent to the reactor chamber in an amount of about 0.01 to 5 mol %.

The co-solvent is preferably selected from the group consisting of methanol, Anhydrous acetonitrile (ACN) and diethyl carbonate (DEC), propylene (PE).

The chelating agent may preferably be selected from the group consisting of crown ethers, TBP, DEHPA, HEHEHP, Bis(2,4,4-trimethylpentyl)phosphinic acid (Cyanex 272), Bis(2,4,4-trimethylpentyl)dithiophosphinic acid (Cyanex 301), di(2,4,4-trimethylpentyl) octyl phosphine oxide (Cyanex 925), Neodecanoic acid (Versatic 10) and 16,16-dimethylheptadecan-1-amine (Pimene JMT).

Preferred Embodiment 6: Extraction of Gold from Activated Carbon

In another preferred embodiment, the source is activated carbon and the target metal is gold. Preferably, the activated carbon comprises $Au(CN)_2^-$ complex.

In this preferred embodiment, the following conditions may be preferable:

the temperature in the reactor chamber is adjusted to a range of about 40 to 100° C.;

the pressure in the reactor chamber is adjusted to a range of about 10 to 60 MPa;

the source comprising the target metal, the chelating agent and the solvent are allowed to react in the reactor chamber for a residence time in a range of about 0.01 to 1 hour;

the source-to-chelating agent ratio is in a range of about 0.01 to 1;

the source comprising the target metal, the chelating agent and the solvent are subjected to an agitation rate in a range of about 750 to 1500 rpm;

the chelating agent comprises $HNO_3$ in a concentration of about 0.01 to 15.7 M; and adding the methanol to the reactor chamber in an amount of about 0.01 to 5 mol %.

The scope of the claims should not be limited by the preferred embodiments set forth in the examples, but should be given the broadest interpretation consistent with the description as a whole.

The invention claimed is:

1. A method for supercritical fluid extraction of at least one target metal from a source, the method comprising:

providing a reactor chamber;

providing a source selected from the group consisting of a battery, a permanent magnet, a bauxite residue, and an activated carbon, the source comprising:

the at least one target metal, being chemically bonded to at least one additional metal via metallic bonds; and at least one impurity;

pre-processing the source;

providing a chelating agent being one or more compounds selected from the group consisting of an organophosphorus compound, a ketone, a dithiocarbamate, a crown ether, a fluorinated compound, 8-hydroxyquinoline, 7-(1-vinyl-3,3,5,5-tetramethylhexyl)-8-hydroxyquinoline, an amide, an organic acid, a quaternary ammonium salt, and an oxime;

providing a solvent;

providing a co-solvent;

adding the pre-processed source the chelating agent, the solvent and the co-solvent into the reactor chamber;

adjusting the temperature in the reactor chamber to a range of about 35 to about 55° C. and the pressure in the reactor chamber so that the solvent is heated and compressed above its critical temperature and pressure;

optionally, providing mechanical agitation to the reactor chamber; and recovering a chelate comprising the target metal, wherein:

the organophosphorus compound is selected from the group consisting of tributyl phosphate (TBP), tributyl phosphate-nitric acid (TBP-$HNO_3$), trialkylphosphine oxide-nitric acid (TRPO-$HNO_3$), tributylphosphine oxide (TBPO), trioctylphosphine oxide (TOPO), triphenylphosphine oxide (TPPO), bis(2-ethylhexyl) phosphate (DEHPA), bis(2-ethylhexyl)monothiophosphoric acid (D2EHTPA), dialkyl phosphinic acid (Cyanex 272), bis(2,4,4-trimethylpentyl)dithiophosphinic acid (Cyanex 301, Cyanex 302), bis-(2-ethylhexyl)phosphoric acid ($B_2$EHPA), carbamoylmethylene phosphine oxide (CMPO), 2-ethylhexyl phosphonic acid mono-2-ethylhexyl ester (PC88A), phosphonoacetic acid (PAA) and N,N-bisphosphono(methyl)glycine (BPG);

the ketone is selected from the group consisting of acetylacetone (AA), trifluoroacetylacetone (TFA), hexafluoroacetylacetone (HFA), trifluoroacetylacetone (TAA), thenoyltrifluoroacetone (TTA), methyl isobutyl ketone (MIBK), 2,2,7-trimethyl-3,5-octanedione (TOD), 2,2,6,6-tetramethyl-3,5-heptanedione (THD), 1,1-dimethyl-3,5-hexanedione (DMHD), 2,6-dimethyl-3,5-heptanedione (DIBM), 1,1,1-trifluoro-4-phenyl-2,5-butanedione (TFBZM) and 1-phenyl-1,3-pentanedione (BZAC);

the dithiocarbamate is selected from the group consisting of lithium bis(trifluoroethyl)dithiocarbamate (LiFDDC), diethyldithiocarbamate (DDC), bis(trifluoroethyl)dithiocarbamate (FDDC), dipropyldithiocarbamate (P3DC), dibutyldithiocarbamate (BDC), dipentyldithiocarbamate (P5DC), dihexyldithiocarbamate (HDC), pyrrolidinedithiocarbamate (PDC) and tetrabutylammonium dibutyldithiocarbamate TBA (BDC);

the crown ether is selected from the group consisting of 2,2-dicyclohexyl-1,4,7,10,13,16,19-heptaoxacyclohenicosane (DCH21C7), 2,3,11,12-dicyclohexano-1,4,7,10,13,16-hexaoxacyclooctadecane (DCH18C6), 1,4,7,10,13-pentaoxacyclopentadecane (15C5), bistriazolocrown ether I (Crown I), bistriazolo-crown ether II (Crown II) and bistriazolo-crown ether III (Crown III);

the fluorinated compound is selected from the group consisting of 1,1,1,2,2,3,3-heptafluoro-7,7-dimethyl-4,6-oactanedione (HFOD), 1,1,1,5,5,5-hexafluoro-2,4-pentanedione (HFAC), thenoyltrifluoroacetone (TTFA), pentadecafluorooactanoic acid (HPFOA), ammonium perfluoropolyether piperazindithiocarbamate (FE-APDC), perfluoropolyether picolylamine (FE-PA), ammonium perfluoropolyether dithiocarbamate (FE-DC), perfluoropolyether dithiol (FE-DT) and heptafluorobutanoylpivaroylmethane (FOD);

the organic acid is selected from the group consisting of neodecanoic acid, diethylenetriaminepentaacetic acid (DTPA), diethylenetriaminepentaacetic dianhydride (DTPA-DA) and triethylenetetraaminehexaacetic acid ($H_6$TTHA);

the amide is selected from the group consisting of N,N,N',N'-tetraoctyldiglycolamide (TODGA), N,N,N',N'-tetraisobutyl-3-oxapentanediamide (TiBODA), N,N,N',N'-tetrabutyl-3-oxapentanediamide (TBODA) and N,N'-dimethyl-N,N'-dibutyltetradecylmalonamide (DMDBTDMADBBP);

the quaternary ammonium salt is N-methyl-N,N,N-trioctylammonium chloride; and the oxime is 2-hydroxy-5-nonylbenzophenone oxime.

2. The method of claim 1, wherein the solvent is one or more compounds selected from the group consisting of $CO_2$, water, methanol, ethanol, benzene, and toluene.

3. The method of claim 1, wherein the co-solvent is one or more compounds selected from the group consisting of methanol, water, ethanol, acetone, hexane, chloroform, dichloromethane, toluene, acetonitrile, tetrahydrofuran, aniline, diethylamine, acetic acid, ethyl acetate, 2-propanol, and an imidazolium-based ionic compound.

4. The method of claim 1, wherein the source is a NiMH battery or a permanent magnet, and the target metal is one or more rare earth elements.

5. The method of claim 4, wherein:

the pressure in the reactor chamber is adjusted to a range of about 20.7 to about 31 MPa;

the source comprising the target metal, the chelating agent, the solvent and the co-solvent are allowed to react in the reactor chamber for a residence time in a range of about 1 to about 2 hours;

the source comprising the target metal and the chelating agent are added in a source-to-chelating agent ratio in the range of about 0.1 to about 0.2 g/mL;

the method comprises providing mechanical agitation to the reactor chamber and the source comprising the target metal, the chelating agent, the solvent and the co-solvent are subjected to an agitation rate in a range of about 750 to about 1500 rpm;

the chelating agent comprises $HNO_3$ in a concentration of about 10.4 to about 15.7 M; and the co-solvent is methanol and is added into the reactor chamber in an amount of about 0.01 to about 2 mol %.

6. The method of claim 1, wherein the source is a bauxite residue, and the target metal is one or more rare earth elements.

7. The method of claim 6, wherein:

the pressure in the reactor chamber is adjusted to a range of about 20.7 to about 45 MPa;

the source comprising the target metal, the chelating agent, the solvent and the co-solvent are allowed to react in the reactor chamber for a residence time in a range of about 0.01 to about 2.0 hours;

the source comprising the target metal and the chelating agent are added in a source-to-chelating agent ratio in the range of about 0.05 to about 0.2 g/mL;

the method comprises providing mechanical agitation to the reactor chamber and the source comprising the target metal, the chelating agent, the solvent and the co-solvent are subjected to an agitation rate in a range of about 1500 to about 2500 rpm;

the chelating agent comprises $HNO_3$ in a concentration of about 15.7 to about 21.4 M;

the co-solvent is added into the reactor chamber in an amount of about 0.01 to about 10 mol %;

the chelating agent is selected from the group consisting of tributyl phosphate (TBP), bis(2-ethylhexyl) phosphate (DEHPA), mono-(2-ethylhexyl)-2-ethylhexyl-phosphate (HEHEHP), bis(2,4,4-trimethylpentyl)phosphinic acid, bis(2,4,4-trimethylpentyl)dithiophosphinic acid, bis(2,4,4-trimethylpentyl)octylphosphine oxide, neodecanoic acid and 16,16-dimethylheptadecan-1-amine; and the chelating agent comprises an acid selected from the group consisting of nitric acid, sulfuric acid, hydrochloric acid, phosphoric acid, hydrofluoric acid, citric acid, acetic acid and oxalic acid.

8. The method of claim 7, wherein the co-solvent is methanol or oxalic acid solution in water.

9. The method of claim 1, wherein the source is a lithium ion battery, and the target metal is selected from the group consisting of lithium, nickel, and cobalt.

10. The method of claim 9, wherein:

the pressure in the reactor chamber is adjusted to a range of about 20 to about 45 MPa;

the source comprising the target metal, the chelating agent, the solvent and the co-solvent are allowed to react in the reactor chamber for a residence time in a range of about 0.01 to about 2 hours;

the source comprising the target metal and the chelating agent are added in a source-to-chelating agent ratio in the range of about 0.01 to about 2 g/mL;

the method comprises providing mechanical agitation to the reactor chamber and the source comprising the target metal, the chelating agent and the solvent are subjected to an agitation rate in a range of about 750 to about 2500 rpm;

the chelating agent comprises $HNO_3$ in a concentration of about 0.01 to about 21.4 M;

the co-solvent is added into the reactor chamber in an amount of about 0.01 to about 5 mol %; and the chelating agent is selected from the group consisting of crown ethers, tributyl phosphate (TBP), bis(2-ethylhexyl) phosphate (DEHPA), mono-(2-ethylhexyl)-2-ethylhexyl-phosphate (HEHEHP), bis(2,4,4-trimethyl-pentyl)phosphinic acid, bis(2,4,4-trimethylpentyl) dithiophosphinic acid, bis(2,4,4-trimethylpentyl) octylphosphine oxide, neodecanoic acid and 16,16-dimethylheptadecan-1-amine.

11. The method of claim 10, wherein the co-solvent is selected from the group consisting of methanol, anhydrous acetonitrile (ACN), diethyl carbonate (DEC), and propylene carbonate (PC).

12. The method of claim 9, wherein the pre-processing of the source comprises a first extraction phase to extract organic components from the lithium ion battery and a second extraction phase to extract the target metal, wherein the first extraction phase and the second extraction phase take place under the same or different reaction conditions.

13. The method of claim 1, wherein the co-solvent is added to the reactor chamber in an amount of about 0.01 to about 50 mol % relative to the total number of moles of solvent.

14. The method of claim 1, wherein the pressure in the reactor chamber is adjusted to a range of about 0.01 to about 45 MPa.

15. The method of claim 1, wherein the source comprising the target metal, the chelating agent and the solvent are allowed to react in the reactor chamber for a residence time in a range of about 0.01 to about 12 hours.

16. The method of claim 1, wherein the source comprising the target metal and the chelating agent are added in a source-to-chelating agent ratio in the range of about 0.01 to about 5 weight (g) per volume (mL).

17. The method of claim 1, wherein the method comprises providing mechanical agitation to the reactor chamber and the source comprising the target metal, the chelating agent and the solvent are subjected to an agitation rate in a range of about 0.01 to about 2500 rpm.

18. The method of claim 1, wherein the chelating agent comprises $HNO_3$ in a concentration of about 0.01 to about 21.4 M.

19. The method of claim 1, wherein the source is a secondary waste feed.

20. The method of claim 1, wherein the chelating agent comprises tributyl phosphate-nitric acid (TBP-$HNO_3$).

* * * * *